(12) United States Patent
Broggi et al.

(10) Patent No.: US 9,420,203 B2
(45) Date of Patent: *Aug. 16, 2016

(54) VISION SYSTEM FOR A VEHICLE

(75) Inventors: Alberto Broggi, Parma (IT); Gary Schmiedel, Oshkosh, WI (US); Christopher K. Yakes, Oshkosh, WI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 1114 days.

This patent is subject to a terminal disclaimer.

(21) Appl. No.: 13/370,136

(22) Filed: Feb. 9, 2012

(65) Prior Publication Data

US 2012/0143430 A1 Jun. 7, 2012

Related U.S. Application Data

(63) Continuation of application No. 11/562,824, filed on Nov. 22, 2006, now Pat. No. 8,139,109.

(60) Provisional application No. 60/805,197, filed on Jun. 19, 2006.

(51) Int. Cl.
*H04N 7/18* (2006.01)
*H04N 5/247* (2006.01)
*G01S 17/02* (2006.01)
(Continued)

(52) U.S. Cl.
CPC .............. *H04N 5/247* (2013.01); *G01S 17/023* (2013.01); *G01S 17/936* (2013.01); *G05D 1/0251* (2013.01); *H04N 13/0242* (2013.01); *G05D 1/024* (2013.01); *G05D 1/027* (2013.01); *G05D 1/0272* (2013.01); *G05D 1/0274* (2013.01); *G05D 1/0278* (2013.01); *G05D 2201/0209* (2013.01); *G05D 2201/0213* (2013.01)

(58) Field of Classification Search
CPC ................ B60R 1/00; B60R 2300/105; B60R 2300/806; H04N 7/181
USPC ...................... 348/118, 148; 382/106; 134/37; 396/419; 701/25, 38, 301; 345/619
See application file for complete search history.

(56) References Cited

U.S. PATENT DOCUMENTS 1,951,089 A 3/1934 Fielder
3,524,069 A 8/1970 Stepanov et al.
(Continued)

FOREIGN PATENT DOCUMENTS

DE 18 16 183 6/1970
DE 41 11 865 A1 10/1991
(Continued)

OTHER PUBLICATIONS

"Telvisant Ready Mix Industry Plan: maximize your ready mix fleet operation", 2003 (2 pgs.).
(Continued)

*Primary Examiner* — Gims Philippe
(74) *Attorney, Agent, or Firm* — Foley & Lardner LLP

(57) ABSTRACT

A vision system includes a processor and a plurality of cameras, each of which is configured to be communicatively coupled to the processor. The processor is configured to select input from different combinations of the plurality of cameras based on a parameter that is associated with at least one of the status of a vehicle and a surrounding environment of the vehicle.

7 Claims, 12 Drawing Sheets

(51) Int. Cl.
  *G01S 17/93* (2006.01)
  *H04N 13/02* (2006.01)
  *G05D 1/02* (2006.01)

(56) References Cited

U.S. PATENT DOCUMENTS

| | | |
|---|---|---|
| 3,690,559 A | 9/1972 | Rudloff |
| 3,729,106 A | 4/1973 | Barbieri |
| 3,764,867 A | 10/1973 | Smith |
| 3,799,284 A | 3/1974 | Hender |
| 3,865,209 A | 2/1975 | Aihara et al. |
| 3,966,067 A | 6/1976 | Reese |
| 4,021,704 A | 5/1977 | Norbeck |
| 4,041,470 A | 8/1977 | Slane et al. |
| 4,088,934 A | 5/1978 | D'Atre et al. |
| 4,097,925 A | 6/1978 | Butler, Jr. |
| 4,113,045 A | 9/1978 | Downing, Jr. |
| 4,162,714 A | 7/1979 | Correll |
| 4,180,803 A | 12/1979 | Wesemeyer et al. |
| 4,196,785 A | 4/1980 | Downing, Jr. |
| 4,292,531 A | 9/1981 | Williamson |
| 4,319,140 A | 3/1982 | Paschke |
| 4,336,418 A | 6/1982 | Hoag |
| 4,347,907 A | 9/1982 | Downing, Jr. |
| 4,355,385 A | 10/1982 | Hampshire et al. |
| 4,423,362 A | 12/1983 | Konrad et al. |
| 4,423,794 A | 1/1984 | Beck |
| 4,444,285 A | 4/1984 | Stewart et al. |
| 4,453,880 A | 6/1984 | Leisse |
| 4,461,988 A | 7/1984 | Plunkett |
| 4,516,121 A | 5/1985 | Moriyama et al. |
| 4,533,011 A | 8/1985 | Heidemeyer et al. |
| 4,542,802 A | 9/1985 | Garvey et al. |
| 4,562,894 A | 1/1986 | Yang |
| 4,596,192 A | 6/1986 | Foerster |
| 4,639,609 A | 1/1987 | Floyd et al. |
| 4,646,232 A | 2/1987 | Chang et al. |
| 4,676,545 A | 6/1987 | Bonfilio et al. |
| 4,702,333 A | 10/1987 | Lippert |
| 4,719,361 A | 1/1988 | Brubaker |
| 4,744,218 A | 5/1988 | Edwards et al. |
| 4,760,275 A | 7/1988 | Sato et al. |
| 4,774,399 A | 9/1988 | Fujita et al. |
| 4,774,811 A | 10/1988 | Kawamura |
| 4,809,177 A | 2/1989 | Windle et al. |
| 4,809,803 A | 3/1989 | Ahern et al. |
| 4,842,326 A | 6/1989 | DiVito |
| 4,843,557 A | 6/1989 | Ina et al. |
| 4,864,154 A | 9/1989 | Copeland et al. |
| 4,864,568 A | 9/1989 | Sato et al. |
| 4,881,756 A | 11/1989 | Kumasaka et al. |
| 4,894,781 A | 1/1990 | Sato et al. |
| 4,941,546 A | 7/1990 | Nist et al. |
| 4,949,808 A | 8/1990 | Garnett |
| 4,953,646 A | 9/1990 | Kim |
| 4,955,443 A | 9/1990 | Bausch |
| 4,966,242 A | 10/1990 | Baillargeon |
| 4,985,845 A | 1/1991 | Goetz et al. |
| 4,993,729 A | 2/1991 | Payne |
| 5,025,253 A | 6/1991 | DiLullo et al. |
| 5,046,007 A | 9/1991 | McCrery et al. |
| 5,062,759 A | 11/1991 | Pieperhoff |
| 5,067,932 A | 11/1991 | Edwards |
| 5,071,307 A | 12/1991 | Carson |
| 5,081,832 A | 1/1992 | Mowill |
| 5,086,863 A | 2/1992 | Tischer |
| 5,088,573 A | 2/1992 | Moll |
| 5,091,856 A | 2/1992 | Hasegawa et al. |
| 5,092,419 A | 3/1992 | Leiber et al. |
| 5,111,901 A | 5/1992 | Bachhuber et al. |
| 5,120,282 A | 6/1992 | Fjaellstroem |
| 5,124,915 A | 6/1992 | Krenzel |
| 5,137,292 A | 8/1992 | Eisen |
| 5,168,946 A | 12/1992 | Dorgan |
| 5,168,948 A | 12/1992 | Roehringer et al. |
| 5,180,456 A | 1/1993 | Schultz et al. |
| 5,189,617 A | 2/1993 | Shiraishi |
| 5,194,851 A | 3/1993 | Kraning et al. |
| 5,195,600 A | 3/1993 | Dorgan |
| 5,201,629 A | 4/1993 | Simpson et al. |
| 5,202,830 A | 4/1993 | Tsurumiya et al. |
| 5,205,587 A | 4/1993 | Orr |
| 5,215,423 A | 6/1993 | Schulte-Hinsken et al. |
| 5,217,083 A | 6/1993 | Bachhuber et al. |
| 5,222,853 A | 6/1993 | Carson |
| 5,227,703 A | 7/1993 | Boothe et al. |
| 5,263,524 A | 11/1993 | Boardman |
| 5,264,763 A | 11/1993 | Avitan |
| 5,289,093 A | 2/1994 | Jobard |
| 5,291,960 A | 3/1994 | Brandenburg et al. |
| 5,301,997 A | 4/1994 | Cudden |
| 5,310,239 A | 5/1994 | Koske et al. |
| 5,343,675 A | 9/1994 | Norton |
| 5,343,971 A | 9/1994 | Heidelberg et al. |
| 5,345,154 A | 9/1994 | King |
| 5,365,436 A | 11/1994 | Schaller et al. |
| 5,369,540 A | 11/1994 | Konrad et al. |
| 5,389,825 A | 2/1995 | Ishikawa et al. |
| 5,409,425 A | 4/1995 | Shibahata |
| 5,416,702 A | 5/1995 | Kitagawa et al. |
| 5,417,299 A | 5/1995 | Pillar et al. |
| 5,418,437 A | 5/1995 | Couture et al. |
| 5,445,347 A | 8/1995 | Ng |
| 5,448,561 A | 9/1995 | Kaiser et al. |
| 5,463,992 A | 11/1995 | Swenson et al. |
| 5,470,187 A | 11/1995 | Smith et al. |
| 5,493,490 A | 2/1996 | Johnson |
| 5,504,655 A | 4/1996 | Underwood et al. |
| 5,508,594 A | 4/1996 | Underwood et al. |
| 5,508,689 A | 4/1996 | Rado et al. |
| 5,516,379 A | 5/1996 | Schultz |
| 5,521,817 A | 5/1996 | Burdoin et al. |
| 5,538,274 A | 7/1996 | Schmitz et al. |
| 5,540,037 A | 7/1996 | Lamb et al. |
| 5,553,673 A | 9/1996 | Hackman |
| 5,555,171 A | 9/1996 | Sonehara et al. |
| 5,557,257 A | 9/1996 | Gieffers |
| 5,558,588 A | 9/1996 | Schmidt |
| 5,558,589 A | 9/1996 | Schmidt |
| 5,558,595 A | 9/1996 | Schmidt et al. |
| 5,568,023 A | 10/1996 | Grayer et al. |
| 5,573,300 A | 11/1996 | Simmons |
| 5,575,730 A | 11/1996 | Edwards et al. |
| 5,575,737 A | 11/1996 | Weiss |
| 5,586,613 A | 12/1996 | Ehsani |
| 5,589,743 A | 12/1996 | King |
| 5,592,375 A | 1/1997 | Salmon et al. |
| 5,595,398 A | 1/1997 | Brown |
| 5,601,392 A | 2/1997 | Smith et al. |
| 5,607,028 A | 3/1997 | Braun et al. |
| 5,619,412 A | 4/1997 | Hapka |
| 5,623,169 A | 4/1997 | Sugimoto et al. |
| 5,629,567 A | 5/1997 | Kumar |
| 5,629,603 A | 5/1997 | Kinoshita |
| 5,636,122 A | 6/1997 | Shah et al. |
| 5,637,933 A | 6/1997 | Rawlings et al. |
| 5,638,272 A | 6/1997 | Minowa et al. |
| 5,646,510 A | 7/1997 | Kumar |
| 5,657,224 A | 8/1997 | Lonn et al. |
| 5,669,470 A | 9/1997 | Ross |
| 5,670,845 A | 9/1997 | Grant et al. |
| 5,672,920 A | 9/1997 | Donegan et al. |
| 5,679,085 A | 10/1997 | Fredriksen et al. |
| 5,680,122 A | 10/1997 | Mio |
| 5,732,074 A | 3/1998 | Spaur et al. |
| 5,736,925 A | 4/1998 | Knauff et al. |
| 5,739,592 A | 4/1998 | Rigsby et al. |
| 5,754,021 A | 5/1998 | Kojima |
| 5,767,584 A | 6/1998 | Gore et al. |
| 5,779,300 A | 7/1998 | McNeilus et al. |
| 5,781,119 A | 7/1998 | Yamashita et al. |
| 5,793,648 A | 8/1998 | Nagle et al. |
| 5,794,165 A | 8/1998 | Minowa et al. |
| 5,812,959 A | 9/1998 | Froeberg et al. |

(56) References Cited

U.S. PATENT DOCUMENTS

| | | |
|---|---|---|
| 5,813,487 A | 9/1998 | Lee et al. |
| 5,813,488 A | 9/1998 | Weiss |
| 5,815,126 A | 9/1998 | Fan et al. |
| 5,819,188 A | 10/1998 | Vos |
| 5,819,201 A | 10/1998 | DeGraaf |
| 5,820,150 A | 10/1998 | Archer et al. |
| 5,827,957 A | 10/1998 | Wehinger |
| 5,828,554 A | 10/1998 | Donegan et al. |
| 5,838,251 A | 11/1998 | Brinkmeyer et al. |
| 5,844,473 A | 12/1998 | Kaman |
| 5,845,221 A | 12/1998 | Hosokawa et al. |
| 5,847,520 A | 12/1998 | Theurillat et al. |
| 5,848,365 A | 12/1998 | Coverdill |
| 5,851,100 A | 12/1998 | Brandt |
| 5,864,781 A | 1/1999 | White |
| 5,879,265 A | 3/1999 | Bek |
| 5,880,570 A | 3/1999 | Tamaki et al. |
| 5,881,559 A | 3/1999 | Kawamura |
| 5,884,206 A | 3/1999 | Kim |
| 5,890,080 A | 3/1999 | Coverdill et al. |
| 5,890,558 A | 4/1999 | Keegan |
| 5,890,865 A | 4/1999 | Smith et al. |
| 5,895,454 A | 4/1999 | Harrington |
| 5,896,418 A | 4/1999 | Hamano et al. |
| 5,913,210 A | 6/1999 | Call |
| 5,918,180 A | 6/1999 | Dimino |
| 5,919,237 A | 7/1999 | Balliet |
| 5,922,040 A | 7/1999 | Prabhakaran |
| 5,924,879 A | 7/1999 | Kameyama |
| 5,925,993 A | 7/1999 | Lansberry |
| 5,928,291 A | 7/1999 | Jenkins et al. |
| 5,930,742 A | 7/1999 | Dodd, Jr. et al. |
| 5,939,794 A | 8/1999 | Sakai et al. |
| 5,945,919 A | 8/1999 | Trask |
| 5,947,855 A | 9/1999 | Weiss |
| 5,948,025 A | 9/1999 | Sonoda |
| 5,949,330 A | 9/1999 | Hoffman et al. |
| 5,950,144 A | 9/1999 | Hall et al. |
| 5,954,470 A | 9/1999 | Duell et al. |
| 5,957,985 A | 9/1999 | Wong et al. |
| 5,973,463 A | 10/1999 | Okuda et al. |
| 5,986,416 A | 11/1999 | Dubois |
| 5,987,365 A | 11/1999 | Okamoto |
| 5,995,898 A | 11/1999 | Tuttle |
| 5,997,338 A | 12/1999 | Pohjola |
| 5,998,880 A | 12/1999 | Kumar |
| 5,999,104 A | 12/1999 | Symanow et al. |
| 6,005,358 A | 12/1999 | Radev |
| 6,012,004 A | 1/2000 | Sugano et al. |
| 6,028,403 A | 2/2000 | Fukatsu |
| 6,038,500 A | 3/2000 | Weiss |
| 6,041,310 A | 3/2000 | Green et al. |
| 6,054,844 A | 4/2000 | Frank |
| 6,059,058 A | 5/2000 | Dower |
| 6,070,538 A | 6/2000 | Flamme et al. |
| 6,088,650 A | 7/2000 | Schipper et al. |
| 6,096,978 A | 8/2000 | Pohjola |
| 6,104,148 A | 8/2000 | Kumar et al. |
| 6,105,984 A | 8/2000 | Schmitz et al. |
| 6,112,152 A | 8/2000 | Tuttle |
| 6,123,497 A | 9/2000 | Duell et al. |
| 6,125,356 A | 9/2000 | Brockman et al. |
| 6,135,806 A | 10/2000 | Pohjola |
| 6,141,608 A | 10/2000 | Rother |
| 6,141,610 A | 10/2000 | Rothert et al. |
| 6,151,539 A * | 11/2000 | Bergholz et al. ............... 701/25 |
| 6,152,673 A | 11/2000 | Anderson et al. |
| 6,154,122 A | 11/2000 | Menze |
| 6,154,658 A | 11/2000 | Caci |
| 6,157,889 A | 12/2000 | Baker |
| 6,173,222 B1 | 1/2001 | Seo et al. |
| 6,181,994 B1 | 1/2001 | Colson et al. |
| 6,182,807 B1 | 2/2001 | Saito et al. |
| 6,208,948 B1 | 3/2001 | Klingler et al. |
| 6,219,626 B1 | 4/2001 | Steinmetz et al. |
| 6,223,104 B1 | 4/2001 | Kamen et al. |
| 6,232,874 B1 | 5/2001 | Murphy |
| 6,240,365 B1 | 5/2001 | Bunn |
| 6,243,628 B1 | 6/2001 | Bliley et al. |
| 6,244,758 B1 | 6/2001 | Solymar et al. |
| 6,246,320 B1 | 6/2001 | Monroe |
| 6,256,580 B1 | 7/2001 | Meis et al. |
| 6,263,268 B1 | 7/2001 | Nathanson |
| 6,263,269 B1 | 7/2001 | Dannenberg |
| 6,269,295 B1 | 7/2001 | Gaugush et al. |
| 6,281,790 B1 | 8/2001 | Kimmel et al. |
| 6,285,932 B1 | 9/2001 | De Bellefeuille et al. |
| 6,298,932 B1 | 10/2001 | Bowman et al. |
| 6,332,745 B1 | 12/2001 | Duell et al. |
| 6,338,010 B1 | 1/2002 | Sparks et al. |
| RE37,610 E | 3/2002 | Tsuchiya et al. |
| 6,356,826 B1 | 3/2002 | Pohjola |
| 6,370,454 B1 | 4/2002 | Moore |
| 6,371,243 B1 | 4/2002 | Donaldson et al. |
| 6,387,007 B1 | 5/2002 | Fini, Jr. |
| 6,404,607 B1 | 6/2002 | Burgess et al. |
| 6,421,593 B1 | 7/2002 | Kempen et al. |
| 6,429,773 B1 | 8/2002 | Schuyler |
| 6,430,488 B1 | 8/2002 | Goldman et al. |
| 6,434,512 B1 | 8/2002 | Discenzo |
| 6,466,258 B1 | 10/2002 | Mogenis et al. |
| 6,480,769 B1 | 11/2002 | Kageyama |
| 6,487,717 B1 | 11/2002 | Brunemann et al. |
| 6,496,393 B1 | 12/2002 | Patwardhan |
| 6,496,775 B2 | 12/2002 | McDonald, Jr. et al. |
| 6,501,368 B1 | 12/2002 | Wiebe et al. |
| 6,542,077 B2 | 4/2003 | Joao |
| 6,549,827 B1 | 4/2003 | Yen |
| 6,553,290 B1 | 4/2003 | Pillar |
| 6,580,953 B1 | 6/2003 | Wiebe et al. |
| 6,593,960 B1 * | 7/2003 | Sugimoto et al. ............. 348/148 |
| 6,609,108 B1 | 8/2003 | Pulliam et al. |
| 6,611,116 B2 | 8/2003 | Bachman et al. |
| 6,611,740 B2 | 8/2003 | Lowrey et al. |
| 6,611,755 B1 | 8/2003 | Coffee et al. |
| 6,615,186 B1 | 9/2003 | Kolls |
| 6,636,790 B1 | 10/2003 | Lightner et al. |
| 6,678,394 B1 | 1/2004 | Nichani |
| 6,694,234 B2 | 2/2004 | Lockwood et al. |
| 6,722,458 B2 | 4/2004 | Hofbauer |
| 6,757,597 B2 | 6/2004 | Yakes et al. |
| 6,798,344 B2 | 9/2004 | Faulkner et al. |
| 6,874,772 B2 | 4/2005 | Oldenettel |
| 6,882,917 B2 | 4/2005 | Pillar et al. |
| 6,885,920 B2 | 4/2005 | Yakes et al. |
| 6,902,630 B2 * | 6/2005 | Ernst et al. ..................... 134/37 |
| 6,909,944 B2 | 6/2005 | Pillar et al. |
| 6,922,615 B2 | 7/2005 | Pillar et al. |
| 6,983,324 B1 | 1/2006 | Block et al. |
| 6,993,421 B2 | 1/2006 | Pillar et al. |
| 7,006,902 B2 | 2/2006 | Archer et al. |
| 7,024,296 B2 | 4/2006 | Squires et al. |
| 7,243,026 B2 * | 7/2007 | Kudo ........................... 701/301 |
| 7,248,283 B2 * | 7/2007 | Takagi et al. ................. 348/118 |
| 7,478,817 B1 | 1/2009 | Carrier |
| 7,555,468 B2 | 6/2009 | El-Damhougy |
| 2001/0034573 A1 | 10/2001 | Morgan et al. |
| 2001/0034656 A1 | 10/2001 | Lucas et al. |
| 2001/0044769 A1 | 11/2001 | Chaves |
| 2002/0005304 A1 | 1/2002 | Bachman et al. |
| 2002/0010643 A1 | 1/2002 | Chaves |
| 2002/0015354 A1 | 2/2002 | Buckelew |
| 2002/0045507 A1 | 4/2002 | Bowen |
| 2002/0049523 A1 | 4/2002 | Diaz et al. |
| 2002/0065594 A1 | 5/2002 | Squires et al. |
| 2002/0065707 A1 | 5/2002 | Lancaster et al. |
| 2002/0107833 A1 | 8/2002 | Kerkinni |
| 2002/0111725 A1 | 8/2002 | Burge |
| 2002/0123832 A1 | 9/2002 | Gotvall et al. |
| 2002/0133273 A1 | 9/2002 | Lowrey et al. |
| 2002/0161489 A1 | 10/2002 | Johnson |
| 2002/0175007 A1 | 11/2002 | Strong |
| 2003/0001736 A1 | 1/2003 | Lewis |
| 2003/0025357 A1 | 2/2003 | Fischer et al. |

(56) References Cited

U.S. PATENT DOCUMENTS

| | | |
|---|---|---|
| 2003/0031543 A1 | 2/2003 | Elbrink |
| 2003/0046179 A1 | 3/2003 | Anabtawi et al. |
| 2003/0080619 A1 | 5/2003 | Bray et al. |
| 2003/0081123 A1 | 5/2003 | Rupe |
| 2003/0085562 A1 | 5/2003 | Sparling |
| 2003/0090077 A1 | 5/2003 | Colet |
| 2003/0105565 A1 | 6/2003 | Loda et al. |
| 2003/0105566 A1 | 6/2003 | Miller |
| 2003/0107191 A1 | 6/2003 | Romer et al. |
| 2003/0114965 A1 | 6/2003 | Fiechter et al. |
| 2003/0130765 A1 | 7/2003 | Pillar et al. |
| 2003/0144011 A1 | 7/2003 | Richards et al. |
| 2003/0158635 A1 | 8/2003 | Pillar et al. |
| 2003/0158638 A1 | 8/2003 | Yakes et al. |
| 2003/0158640 A1 | 8/2003 | Pillar et al. |
| 2003/0163228 A1 | 8/2003 | Pillar et al. |
| 2003/0163229 A1 | 8/2003 | Pillar et al. |
| 2003/0163230 A1 | 8/2003 | Pillar et al. |
| 2003/0163233 A1 | 8/2003 | Song et al. |
| 2003/0171854 A1 | 9/2003 | Pillar et al. |
| 2003/0182034 A1 | 9/2003 | Katagishi et al. |
| 2003/0195680 A1 | 10/2003 | Pillar |
| 2003/0200015 A1 | 10/2003 | Pillar |
| 2003/0205422 A1 | 11/2003 | Morrow et al. |
| 2003/0208309 A1 | 11/2003 | Triphathi |
| 2003/0230443 A1 | 12/2003 | Cramer et al. |
| 2003/0233178 A1 | 12/2003 | Sinex |
| 2004/0002794 A1 | 1/2004 | Pillar et al. |
| 2004/0019414 A1 | 1/2004 | Pillar et al. |
| 2004/0021569 A1 | 2/2004 | Lepkofker et al. |
| 2004/0023635 A1 | 2/2004 | Impson et al. |
| 2004/0024502 A1 | 2/2004 | Squires et al. |
| 2004/0030451 A1 | 2/2004 | Solomon |
| 2004/0039502 A1 | 2/2004 | Wilson et al. |
| 2004/0039504 A1 | 2/2004 | Coffee et al. |
| 2004/0039510 A1 | 2/2004 | Archer et al. |
| 2004/0055802 A1 | 3/2004 | Pillar et al. |
| 2004/0069865 A1 | 4/2004 | Rowe et al. |
| 2004/0070515 A1 | 4/2004 | Burkley et al. |
| 2004/0133319 A1 | 7/2004 | Pillar et al. |
| 2004/0133332 A1 | 7/2004 | Yakes et al. |
| 2004/0167709 A1 | 8/2004 | Smitherman et al. |
| 2004/0193334 A1 | 9/2004 | Carlsson et al. |
| 2004/0199302 A1 | 10/2004 | Pillar et al. |
| 2004/0203974 A1 | 10/2004 | Seibel |
| 2005/0004723 A1 | 1/2005 | Duggan et al. |
| 2005/0004733 A1 | 1/2005 | Pillar et al. |
| 2005/0018627 A1 | 1/2005 | Cardei et al. |
| 2005/0021197 A1 | 1/2005 | Zimmerman et al. |
| 2005/0021199 A1 | 1/2005 | Zimmerman et al. |
| 2005/0038934 A1 | 2/2005 | Gotze et al. |
| 2005/0049944 A1 | 3/2005 | Chernoff et al. |
| 2005/0054351 A1 | 3/2005 | McAlexander |
| 2005/0060246 A1 | 3/2005 | Lastinger et al. |
| 2005/0113988 A1 | 5/2005 | Nasr et al. |
| 2005/0113996 A1 | 5/2005 | Pillar et al. |
| 2005/0114007 A1 | 5/2005 | Pillar et al. |
| 2005/0119806 A1 | 6/2005 | Nasr et al. |
| 2005/0128431 A1 | 6/2005 | Jannard et al. |
| 2005/0131600 A1 | 6/2005 | Quigley et al. |
| 2005/0197749 A1 | 9/2005 | Nichols et al. |
| 2005/0209747 A1 | 9/2005 | Yakes et al. |
| 2005/0234622 A1 | 10/2005 | Pillar et al. |
| 2006/0018513 A1* | 1/2006 | Sogawa ............ 382/106 |
| 2006/0020380 A1 | 1/2006 | Saito et al. |
| 2006/0114324 A1 | 6/2006 | Farmer et al. |
| 2006/0129292 A1* | 6/2006 | Ohkubo ............ 701/38 |
| 2006/0170771 A1* | 8/2006 | Chien et al. ............ 348/148 |
| 2006/0171704 A1* | 8/2006 | Bingle et al. ............ 396/419 |
| 2006/0268006 A1* | 11/2006 | Kawashima ............ 345/619 |
| 2007/0228676 A1 | 10/2007 | Stegmann |
| 2007/0235584 A1 | 10/2007 | Corman et al. |
| 2007/0299794 A1 | 12/2007 | El-Damhougy |
| 2007/0299947 A1 | 12/2007 | El-Damhougy |
| 2008/0189009 A1 | 8/2008 | Wang et al. |
| 2008/0195277 A1 | 8/2008 | Stiller |
| 2010/0253017 A1 | 10/2010 | Vanraaphorst |
| 2010/0268409 A1 | 10/2010 | Vian et al. |
| 2011/0093166 A1 | 4/2011 | Li et al. |
| 2013/0345920 A1 | 12/2013 | Duggan et al. |

FOREIGN PATENT DOCUMENTS

| | | |
|---|---|---|
| DE | 40 41 483 A1 | 6/1992 |
| DE | 41 08 647 A1 | 9/1992 |
| DE | 44 31 929 C1 | 10/1995 |
| DE | 198 46 664 A1 | 4/1999 |
| DE | 197 49 074 A1 | 5/1999 |
| DE | 199 29 434 A1 | 12/2000 |
| EP | 0 496 302 A1 | 7/1992 |
| EP | 0 504 913 A1 | 9/1992 |
| EP | 0 266 704 B1 | 6/1993 |
| EP | 0 630 831 A1 | 12/1994 |
| EP | 0 791 506 A2 | 8/1997 |
| EP | 0 812 720 B1 | 12/1997 |
| EP | 0 622 264 B1 | 11/1998 |
| EP | 0 894 739 A1 | 2/1999 |
| EP | 0 898 213 A1 | 2/1999 |
| EP | 0 949 122 A2 | 10/1999 |
| EP | 1 018 451 A1 | 7/2000 |
| EP | 0 805 059 B1 | 8/2000 |
| EP | 1 087 343 A1 | 3/2001 |
| EP | 1 092 406 A2 | 4/2001 |
| EP | 0 564 943 B1 | 6/2001 |
| EP | 1 115 264 A2 | 7/2001 |
| EP | 1 229 636 A2 | 8/2002 |
| EP | 1 504 929 | 2/2005 |
| EP | 1 504 929 A2 | 2/2005 |
| EP | 1 844 961 | 10/2007 |
| FR | 2658259 A1 | 8/1991 |
| GB | 1 308 318 | 2/1973 |
| GB | 2 263 376 A | 7/1993 |
| GB | 2 302 850 A | 2/1997 |
| JP | 60-216703 A | 10/1985 |
| JP | 11-212641 | 8/1999 |
| JP | 2000-333160 | 11/2000 |
| JP | 2002-196817 | 7/2002 |
| SE | 507046 C2 | 3/1998 |
| WO | WO-95/15594 A1 | 6/1995 |
| WO | WO-96/32346 A1 | 10/1996 |
| WO | WO-96/40573 A1 | 12/1996 |
| WO | WO-97/02965 A1 | 1/1997 |
| WO | WO-98/19875 A1 | 5/1998 |
| WO | WO-98/30961 A1 | 7/1998 |
| WO | WO-99/23783 A2 | 5/1999 |
| WO | WO-00/69662 A1 | 11/2000 |
| WO | WO-00/79727 A2 | 12/2000 |
| WO | WO-01/15001 A2 | 3/2001 |
| WO | WO-01/54939 A2 | 8/2001 |
| WO | WO-03/055714 A1 | 7/2003 |
| WO | WO-03/059455 A2 | 7/2003 |
| WO | WO-03/060831 A2 | 7/2003 |
| WO | WO-03/061235 A2 | 7/2003 |
| WO | WO-03/061235 A3 | 7/2003 |
| WO | WO-03/093046 A2 | 11/2003 |
| WO | WO-03/093046 A3 | 11/2003 |
| WO | WO-03/060831 A3 | 3/2004 |
| WO | WO-2004/052756 A1 | 6/2004 |
| WO | WO-03/059455 A3 | 7/2004 |
| WO | WO-2005/030614 A1 | 4/2005 |

OTHER PUBLICATIONS

Advanced Wireless Technology for CAN and DeviceNet, available at www.matrric.com, Apr. 2003, 1 page, Pennsylvania, United States of America.

Aircraft Internal Time Division Multiplex Data Bus, MIL STD 1553 (USAF), Aug. 30, 1973, 29 pgs.

AssetVision Brochure, printed on Aug. 8, 2001, 3 pgs.

AssetVision Product Specification Preliminary, Wireless Link, revised date May 18, 1999, 63 pages.

Barraco Klement, M.A., Agile Support Project—Global Hawk Program, Jan.-Feb. 1999, pp. 66-70 (5 pgs.).

(56) References Cited

OTHER PUBLICATIONS

Belluta, P. et al., "Terrain Perception for DEMO III," Proceedings of the IEEE Intelligent Vehicles Symposium 2000, Oct. 3-5, 2000 (8 pgs.).
Bertozzi, Massimo et al., "Stereo Inverse Perspective Mapping—Theory and Applications," Image Vision Computing, Jun. 1998, pp. 585-590 (8 pgs.).
Bose, B.K. et al., 1CHigh Frequency AC vs. DC Distribution System for Next Generation Hybrid Electric Vehicle 1D; Industrial Electronics, Control and Instrumentation, 1996: Proceedings of the 1996 IEEE IECON 22nd International Conference on Taipei, Taiwan; Aug. 5-10, 1996, New York, NY; pp. 706-712.
Braid, Deborah et al., "The TerraMax Autonomous Vehicle," Journal of Field Robotics, Sep. 2006 (17 pgs.).
Broggi, Alberto et al., "Obstacle Detection with Stereo Vision for Off-Road Vehicle Navigation," Proceedings of the 2005 IEEE Computer Society Conference on Computer Vision and Pattern Recognition, 2005 (8 pgs.).
Broggi, Alberto et al., "Single Frame Stereo Vision System for Reliable Obstacle Detection used during the 2005 DARPA Grand Challenge on TerraMax," Proceedings of the 2006 IEEE Intelligent Transportation Systems Conference, Toronto, Canada, Sep. 17-20, 2006 pp. 745-752 (8 pgs.).
Cadec Corporation, Onboard Computer—Mobius TTS Smarter Mobile Logistics on the Road, Londonderry, NH, estimated date obtained of Aug. 8, 2001, 4 pgs.
CarPort—The Only Link Between the Auto and the PC, Vetronix Corporation, available at http://www.vetronix.com/telematics/carport/description.html, printed on Jul. 30, 2003, 1 page.
CarPort by Vertronix, "User's Guide Version 1.0," Vetronix Corporation, Nov. 1999 (40 pgs.).
Caterpillar, Technology Products—MineStar, Minestar, printed on Aug. 8, 2001, 2 pgs.
Construction, "Equipment Tracking—A New Asset Management Method"; Equipment Today, Oct. 1999 (3 pgs.).
Customer Applications, "Benefits of Monitoring and Tracking of Heavy Equipment:" MobileNet; printed on Aug. 8, 2001, marked as copyright 2000 (2 pgs.).
Dana Corporation, Dana Spicer Central Tire Inflation System Specifications, Kalamazoo, Michigan, May 2000 (2 pgs.).
Dang Thao et al., "Fusing Optical Flow and Stereo Disparity for Object Tracking," The IEEE 5th International Conference on Intelligent Transportation Systems—Proceedings, Sep. 3-6, 2002 (8 pgs.).
Dang, Thao et al., "Fast Object Hypotheses Generation Using 3D Position and 3D Motion," Proceedings of the 2005 IEEE Computer Society Conference on Computer Vision and Pattern Recognition, 2005 (6 pgs.).
Dearborn Group Technology, Dearborn Group Puts Wireless Vehicle Connectivity in Customers' Hands, Mar. 3, 2001, 3 pgs.
Dick Smith and Russ Walker, "Coming to a multiplex near you," WasteAge.com, Fire Chief, Feb. 1, 2003 (5 pgs.).
DriverTech, Inc., DriverTech—Features, printed on Jul. 29, 2003, 1 page.
DriverTech, Inc., DriverTech—Functional Specifications, printed on Jul. 29, 2003, 5 pgs.
DriverTech, Inc., DriverTech—Hardware & Software, printed on Jul. 29, 2003, 3 pgs.
DriverTech, Inc., DriverTech—Wireless IP Based Fleet Management System, printed on Jul. 29, 2003, 2 pgs.
Estrada Francisco J. et al., "Quantitative Evaluation of a Novel Image Segmentation Algorithm," IEEE Computer Society Conference on Computer Vision and pattern Recognition [2], Jun. 20-25, 2005 (9 pgs.).
FAQ, "Global Asset Monitoring," MobileNet; printed on Aug. 8, 2001, copyright marked as 1999, 2 Pages.
Goldberg, Steven B. et al., "Stereo Vision and Rover Navigation Software for Planetary Exploration," 2002 IEEE Aerospace Conference Proceedings, Mar. 9-16, 2002, vol. 5 of 7 (14 pgs.).

Griffin, J., Look, up in the sky . . . it's . . . it's a . . . fleet management satellite! American Rental Association, MobileNet, printed on Aug. 8, 2001, copyright marked 2000, 4 pgs.
HGI Wireless Inc., HGI Wireless Products and Services, Product and Services, Product Summary HGI Wireless Inc.; printed on Aug. 8, 2001, copyright marked as 2001, 2 pgs.
Home Page, "An Introduction to InterTrak," InterTrak Tracking Services, LLC., printed on Aug. 8, 2001, copyright marked as 2001 (3 pgs.).
Hu, Zhencheng et al., "Complete U-V-Disparity Study for Stereovision Based 3D Driving Environmental Analysis," 3DIM 2005 Proceedings of the Fifth International Conference on 3-D Digital Imaging and Modeling, Jun. 13-16, 2005 (9 pgs.).
I.D. Systems, Inc., I.D. Systems | Products Gallery, The I.D. Systems Product Gallery, printed on Aug. 8, 2001, 3 pgs.
IA-32 Intel Architecture Optimization Reference Manual, Jun. 2005 (512 pgs.).
IBM Press room, IBM Service After Sales Solutions Open Lucrative New Customer Service Markets for Manufacturers and Service Organizations, Press Release, White Plains, NY, Jun. 26, 2001, 2 pgs.
Instruction and Parts Manual, Machine type: GCB 1000 SPLIT, May 23, 2002, 80 pages, Geesink Norba Group.
Instruction and Parts Manual, Machine type: GPM IIe, Jul. 10, 2002, 74 pages, Geesink Norba Group.
Instruction Manual for the Training AS-i bus, Aug. 2002, 31 pages, Version 3.0, Geesink Norba Group.
Interests, "Global Remote Asset Monitoring," MobileNet, printed on Aug. 8, 2001, copyright marked 2000 (2 pgs.).
International Search Report and Written Opinion for Application No. PCT/US2007/071473, mailing date Jun. 27, 2008, 11 pages.
International Search Report and Written Opinion for International Application No. PCT/US2004/031216, dated Oct. 31, 2005, 13 pgs.
International Search Report and Written Opinion for International Application No. PCT/US2009/043980, mail date Dec. 29, 2009, 10 pages.
Kato, Takeo et al., "An Obstacle Detection Method by Fusion of Radar and Motion Stereo," IEEE Transactions on Intelligent Transportation Systems, Sep. 2002, vol. 3, No. 3 (7 pgs.).
Khan, I.A., "Automotive Electrical Systems: Architecture and Components," Digital Avionics Systems Conference, 1999, IEEE pp. 8.C.5-1-8.C.5-10 (10 pgs.).
Konolige, Kurt, "Small Vision Systems: Hardware and Implementation," Robotics Research—The Eight International Symposium, (cover page and pp. 203-212).
Labayrade, Raphael et al., "A Single Framework for Vehicle Roll, Pitch, Yaw Estimation and Obstacles Detection by Stereovision," IEEE IV2003 Intelligent Vehicle Symposium—Proceedings, Jun. 9-11, 2003 (8 pgs.).
Labayrade, Raphael et al., "Real Time Obstacle Detection in Stereovision on Non Flat Road Geometry Through 'V-disparity' Representation," IV'2002 IEEE Intelligent Vehicle Symposium—Proceeding Part 2 (1), Jun. 17-21, 2002, (8 pgs.).
Lemonde, Vincent et al., "Obstacle Detection With Stereovision," Mechatronics and Robotics '04, Sep. 13-15, 2004 (7 pgs.).
Luka, J and Stubhan, F, "Mobile Diagnosis," Vehicle Electronics Conference, 1999 (IVEC 99), proceedings of the IEEE International Changchun, China, Sep. 6-9, 1999 (6 pgs.).
Manduchi, R., "Obstacle Detection and Terrain Classification for Autonomous Off-Road Navigation," Autonomous Robots, 2005 (pp. 81-102).
Matric, "Wireless CAN Bridge CB-300," Apr. 10, 2002 (20 pgs.).
Miltope Recieves $13.5 Million Order for SPORT, Montgomery, AL, Jan. 25, 2000 (1 pg.).
Miltope Recieves $16 Million Defense System Integration Award, PRNewswire, Mar. 26, 2000 (1 pg.).
Mobile Workstation, "MobileNet Mobile Workstation," printed on Aug. 8, 2001, copyright marked 2000 (2 pgs.).
MobilEmail, "MobileNet MobilEmail," printed on Aug. 8, 2001, copyright marked 2000 (2 pgs.).
Mussaf, J.S., "The Space Shuttle Clickable Map," Retrieved from the Internet: http://web.archive.org/web/2001040101, Apr. 1, 2001 (24 pgs.).

(56) References Cited

OTHER PUBLICATIONS

Namuduri, C.S. et al., "High Power Density Electric Drive for an Hybrid Vehicle," Applied Power Electronics Conference and Exposition, Feb. 15, 1998, pp. 34-40 (7 pgs.).
Nathanson M., "Vehicle Intelligence and Remote Wireless OBD," SAE Technical Paper, Dec. 4-6, 2000 (15 pgs.).
Nedevschi, Sergiu et al., "High Accuracy Stereovision Approach for Obstacle Detection on Non-Planar Roads," (6 pgs.).
New Unimog Generation, collection of documents each individually dated as shown (24 pgs.).
Nissan Moter Phils., Inc., "Client: Nissan Motor Philippines, Inc. Project," RADIX Systems Service Corporation, pinted on Aug. 8, 2001, copyright marked 2000 (1 pg.).
Nister, David et al., "Visual Odometry," IEEE Computer Society Conference on Computer Vision and Pattern Recognition, Jun. 27-Jul. 2, 2004 (9 pgs.).
Oshkosh Truck Corporatiion, "Oshkosh Showcases ProPulse Hybrid Electric System at Major Defense Exhibition," Oct. 21, 2002 (1 pg.).
Oshkosh Truck Corporation "M1070F Heavy Equipment Transporter & Trailer" Sep. 2001 (8 pgs.).
Oshkosh Truck Corporation, "HEMTT—Heavy Expanded Mobility Tactical Truck M977 Series Truck," Mar. 2000 (12 pgs. as photocopied).
Oshkosh Truck Corporation, "LHS Decontamination Mission Module," (2 pgs.).
Oshkosh Truck Corporation, "LVS—Logistic Vehicle System (MK48 Series)," (6 pgs.).
Oshkosh Truck Corporation, "M1977 CBT (Common Bridge Transporter)," (2 pgs.).
Oshkosh Truck Corporation, "Medium Tactical Vehicle Replacement," Aug. 2000 (6 pgs.).
Oshkosh Truck Corporation, "MTVR Dump Body Variant (Medium Tactical Vehicle Replacement)," Sep. 2001 (2 pgs.).
Oshkosh Truck Corporation, "MTVR Wrecker Variant (MK36 Wrecker Recovery Vehicle)," Sep. 2001 (2 pgs.).
Oshkosh Truck Corporation, "Oshkosh Demonstrates ProPulse, the First Electric Hybrid—Drive Heavy Defense Truck," Feb. 27, 2000 (2 pgs.).
Oshkosh Truck Corporation, "Oshkosh Receives Federal Government Funding to Develop ProPulse Alternative Drive System for Military Trucks," Aug. 31, 2001 (2 pgs.).
Oshkosh Truck Corporation, "Oshkosh Truck and Ohio State University Design Robotic Vehicle to Compete in Desert Race," Feb. 11, 2004 (2 pgs.).
Oshkosh Truck Corporation, "Oshkosh Truck Awarded Contract for U.S. Army Future Tactical Truck Concepts and Technology Evaluations," Dec. 2, 2003 (2 pgs.).
Oshkosh Truck Corporation, "Oshkosh Truck Rolls Out Next Generation of Command Zone Advanced Electronics System to Military Market," Oct. 21, 2002 (2 pgs.).
Oshkosh Truck Corporation, "Oshkosh Truck's Robotic Truck Qualifies for Pentagon's $1 Million Desert Race," Mar. 12, 2004 (2 pgs.).
Oshkosh Truck Corporation, "Palletized Load System (PLS)—Concrete Mobile Mixer Module," (2 pgs.).
Oshkosh Truck Corporation, "Palletized Load System (PLS)—Potable Water Distributor Module," (2 pgs.).
Oshkosh Truck Corporation, "The One to Count on Through Hell and High Water," Sep. 2000 (4 pgs.).
Ozguner, Umit et al., "Teama TereraMax and the DARPA Grand Challenge: A General Overview," 2004 IEEE Intelligent Vehicle Symposium, Jun. 14-17, 2004 (7 pgs.).
Products—CMS Products, "CMS Products," Cadec Corporation, printed on Aug. 8, 2001, copyright marked 2001 (6 pgs.).
Products—Mobius TTS, "Mobius TTS / Onboard Computer," Cadec Corporation, printed on Aug. 8, 2001, copyright marked 2001 (2 pgs.).
Products—Mobius TTS, "Mobius TTS," Cadec Corporation, printed on Aug 8, 2001, copyright marked 2001 (3 pgs.).
Products—Overview, "Overview—The Right Stuff for 25 Years," Cadec Corporation, printed on Aug. 8, 2001, copyright marked 2001 (2 pgs.).
Products, "MobileNet Products," printed on Aug. 8, 2001, copyright marked 2000 (2 pgs.).
Rajashekara, K., "History of Electric Vehicles in General Motors," Industry Applications Society Annual Meeting, Oct. 2-8, 1993, pp. 447-454 (8 pgs.).
Rankin, Arturo et al., "Evaluation of Stereo Vision Obstacle Detection Algorithms for Off-Road Autonomous Navigation," (15 pgs.).
Red Team DARPA Grand Challenge 2005 Technical Paper, Aug. 24, 2005 (15 pgs.).
Red Team Too DARPA Grand Challenge 2005 Technical Paper, Aug. 24, 2005 (15 pgs.).
Reitzner, S. and Schleicher, M., "Options and risks—PDAs in the automotive area," Aug. 2001 (3 pgs.).
RM CANview Bluetooth/TCP/IP, RM Michaelides Software & Electronic Corp., Nov. 19, 2002 (2 pgs.).
Scharstein, Daniel et al., "A Taxonomy and Evaluation of Dense Two-Fram Stereo Correspondence Algorithms," IEEE Workshop on Stereo and Multi-Baseline Vision, Dec. 9-10, 2001 (12 pgs.).
Shalabi, L., "Equipment Tracking—A New Asset Management Method"; Equipment Today, Oct. 1999 (3 pgs.).
Singh, Sanjiv et al., "Recent Progress in Local and Global Traversability for Planetary Rovers," 2000 IEEE International Conference on Robotics and Automation, Apr. 24-28, 2000 (9 pgs.).
Skibinski, J. et al., "Internet-based Vehicle Communication Network," SAE Technical Paper Series, Dec. 4-6, 2000 (8 pgs.).
SPORT Ad and Technical Specifications Sheet, Miltope Corporation, (2 pgs.).
STE/ICE-R Design Guide for Vehicle Diagnostic Connector Assemblies, Report No. CR-82-588-003 REV Feb. 1, 1988 (182 pgs.).
Steele, John et al., "Stereo Images for Object Detection in Surface Mine Safety Application," Nov. 4, 2003 (pp. 1-11).
Sun, Jian et al., "Symmetric Stereo Matching for Occlusion Handling," IEEE Computer Society Conference on Computer Vision and Pattern Recognition [1], Jun. 20-25, 2005 (9 pgs.).
Talukder, A. et al., "Fast and Reliable Obstacle Detection and Segmentation for Cross-Country Navigation," IV'2002 Intelligent Vehicle Symposium—Proceedings Part 2, Jun. 17-21, 2002 (11 pgs.).
Team DAD Technical Paper DARPA Grand Challenge 2005, Aug. 26, 2005 (12 pgs.).
Technology Products—MineStar, "Minestar," Caterpillar, printed on Aug. 8, 2001 (2 pgs.).
Technology Products—VIMS, "Technology Products," Caterpillar, printed on Aug. 8, 2001 (2 pgs.).
Telematics Diagram, Vetronix Corporation, printed on Jul. 30, 2003 (1 pg.).
Top 100, "Construction Equipment's editors pick the 100 most significant product introductions of the year," Construction Equipment Magazine, Dec. 1999 (1 pg.).
TrakPak2000, "The TrakPak 2000—A Self-Contained Mobile Tracking Unit," printed on Aug. 8, 2001, copyright marked 2000 (2 pgs.).
Trimble Information Services, "Trimble Information Services Power the Transformation of Location Data . . . into Location Information" printed on Aug. 8, 2001 (4 pgs.).
Trimble Navigation Limited, "Telvisant Fleet Management—The Concrete Solution," Mar. 2002 (2 pgs.).
Trimble, "Telvisant Ready Mix Industry Plan: maximize your ready mix fleet operation," 2004 (2 pgs.).
Trimble, "Trimble and McNeilus Enhance Televisant Fleet Management System for the Ready Mix Market," Feb. 4, 2003 (2 pgs.).
Trimble, "Trimble and McNeilus Form Alliance to Factory-Install Fleet Management Solutions on Ready Mix Concrete Trucks," Mar. 19, 2002 (2 pgs.).
Tsai, Roger Y., "A Versatile Camera Calibration Technique for High-Accuracy 3D Machine Vision Metrology Using Off-the-Shelf TV Cameras and Lenses," IEEE Journal of Robotics and Automation, Aug. 1987, (cover pages and pp. 323-344), vol. RA-3, No. 4, A Publication of the IEEE Robotics and Automation Council.

(56) References Cited

OTHER PUBLICATIONS

Van Der Mark, W., "Stereo based Navigation in Unstructured Environments," IMTC 2001 Proceedings of the 18th IEEE Instrumentation and Measurements Technology Conference, Budapest, Hungary, May 21-23, 2001 (cover pages and pp. 2038-2043).

Vermeer Deal, "MobileNet asset monitoring system selected by Vermeer Manufacturing Company," Alpharetta, GA, Nov. 1, 1999 (2 pgs.).

Vetronix Coporation, "Vehicle Internet Port (VIP)—Internet Access System for AutoPC," printed on Jul. 30, 2003 (1 pg.).

Vetronix Corporation, "Vehicle Internet Port (VIP) System Description," printed on Jul. 30, 2003 (2 pgs.).

Vetronix Corporation, "WirelessRoad Fleet Management System," printed on Jul. 30, 2003 (2 pgs.).

Vetronix Corporation, "WirelessRoad Frequently Asked Questions," printed on Jul. 30, 2003 (2 pgs.).

Vetronix Corporation, "WirelessRoad System Description," printed on Jul. 30, 2003 (5 pgs.).

Welcome to Modular Mining Systems, Inc.—Products, "Products—Dispatch Systems for Open Pit Mines," printed on Aug. 8, 2001, copyright marked 1996-2001 (1 pg.).

Welcome to Modular Mining Systems, Inc.—Products, "Products—Vehicle Health Systems (VHS)," printed on Aug. 8, 2001 (1 pg.).

Williamson et al., "A Trinocular Stereo System for Highway Obstacle Detection," Robotics and Automation, Proceedings, 1999 IEEE International Conference, Detroit, Michigan, May 10-15, 1999, pp. 2267-2273.

Wireless Data—Introduction, printed on Aug. 8, 2001 (7 pgs.).

Wireless Link Corporation—News Room, "CSI Wireless Receives $7M Order from InterTrak," Jan. 9, 2001 (3 pgs.).

Woodard, S. "Computer Diagnoses Vehicle Deficiencies," Fort Jackson Leader, Jul. 26, 2002 (2 pgs.).

Wright et al., "Oshkosh Trucks—75 Years of Specialty Truck Production," Motorbooks International Publishers & Wholesalers, 1992, pp. 119-126 (10 pgs.).

International Search Report for PCT Application No. PCT/US2009/043980, dated Dec. 29, 2009, 6 pages.

\* cited by examiner

VISION SYSTEM FOR A VEHICLE

CROSS REFERENCE TO RELATED APPLICATIONS

This patent application is a continuation of U.S. patent application Ser. No. 11/562,824, entitled "Vision System for an Autonomous Vehicle," filed Nov. 22, 2006, which claims the benefit under 35 U.S.C. §119(e) of U.S. Prov. Pat. App. No. 60/805,197, entitled "Vision System for an Autonomous Vehicle," filed on Jun. 19, 2006, both of which are hereby incorporated by reference herein in their entireties.

BACKGROUND

Autonomous and semi-autonomous vehicles have the potential to be used in an increasing number of applications. For example, the use of autonomous vehicles may be desirable in military or civilian applications that would otherwise expose human operators or passengers to dangerous environments. Such autonomous vehicles may include a control system configured to receive information regarding, for example, the surrounding terrain, upcoming obstacles, a particular path, etc., and to automatically respond to this information in place of a human operator by commanding a series of maneuvers so that the vehicle is able to negotiate the terrain, avoid the obstacles, or track a particular path with little or no human intervention.

In certain applications, the autonomous vehicle may be required to operate in a continuously changing environment. For example, the autonomous vehicle may be required to track a path over alternate stretches of flat, winding, or hilly terrain at varying speeds, and across which many obstacles, such as other vehicles or various other objects, or even humans may appear at unexpected places or times. Without the presence of a human operator to assess the changing conditions, the autonomous vehicle may collide with an obstacle or otherwise attempt maneuvers beyond its reactive capabilities. In certain other applications, the autonomous vehicle may be required to operate without detection, such as in a military operation or even at night. Accordingly, it would be desirable to provide an improved autonomous vehicle that is configured to address these and other concerns.

SUMMARY

Autonomous and/or semi-autonomous vehicles are described herein. The vehicles may be any suitable type or make of vehicle. The vehicle may be a military vehicle or a civilian vehicle. In either context, the vehicle may be configured to transport large payloads over long distances and/or off-road. The vehicle may include various subsystems such as a throttle system, transmission system, braking system, and/or steering system. In some embodiments, the vehicle may include an all-wheel steering system, an independent suspension, and/or a compressed air system. The compressed air system may be used to operate the brakes and/or other vehicle subsystems.

The vehicle may include a vehicle control system that is used to operate the vehicle autonomously. The vehicle control system may include a variety of sensors which gather information regarding the status of the vehicle, the environment around the vehicle (especially in front of the vehicle), the position of the vehicle, and so forth. A variety of systems may be used to provide information to the vehicle control system to allow for autonomous operation of the vehicle. For example, such systems may include LIDAR systems (also referred to as LADAR systems in a military context), radar systems, vision systems, GPS systems, and so forth.

The entire control system or various components thereof may be provided as part of a kit which is used to retrofit existing vehicles to make them autonomous. This may be particularly desirable in situations where there are a fleet of vehicles (e.g., in a military or civilian context) that have similar configurations. For some vehicles that already include an electronic control system, the kit may simply include some sensors and additional software (or hardware if needed). For those vehicles that are largely controlled mechanically (mechanical steering, braking, throttle, etc.) the kit may include additional motors and/or other sub control systems for the vehicle.

The vehicle control system may include a vision system that is used to detect obstacles relative to the vehicle and/or identify a path for the vehicle to follow. The vision system may include a plurality of cameras that are configured to receive input in the form of images of the surrounding environment. The vision system may include a processor that is configured to receive and process the images to extract useful information about the surrounding environment. In a military context, one advantage of the vision system relative to other obstacle detection techniques such as LIDAR or radar is that the vision system does not transmit electromagnetic radiation that can be detected and/or jammed by the enemy.

In one embodiment, the vision system may include at least three cameras. The vision system may be configured to receive input from various combinations of the three cameras depending on the status of the vehicle (e.g., speed, steering angle, and so forth) or depending on the surrounding environment (e.g., the rate that obstacles are detected, the size of the obstacles, and so forth). For example, the three cameras may be mounted on the vehicle so that the cameras are asymmetrically spaced apart from each other. Thus, the distance or baseline between each combination of two cameras is different. The vision system may be configured to use a combination of the cameras having a wide baseline in order to detect obstacles that are relatively far away. The vision system may be configured to use a combination of cameras having a shorter baseline to detect obstacles that are closer to the cameras. The reason for doing this is that objects that are far away from each other can be identified and matched in images taken from cameras having a wide baseline. However, if the same objects are positioned much closer to the cameras, the wide baseline of the cameras results in the objects looking very different in the images. Thus, when the objects are nearby, cameras having a shorter baseline may be used to make it easier to identify and match the object in the images taken from the cameras.

Other features and advantages of the subject matter described herein will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

DRAWINGS

The exemplary embodiments will hereafter be described with reference to the accompanying drawings, wherein like numerals depict like elements, and:

DETAILED DESCRIPTION

Before turning to the FIGS. which illustrate the exemplary embodiments in detail, it should be understood that the subject matter described herein is not limited to the details or methodology set forth in the following description or illustrated in the FIGS. The subject matter described herein is capable of being provided in other embodiments or being practiced or carried out in various ways. It should also be understood that the phraseology and terminology employed herein is for the purpose of description only and should not be regarded as limiting. Further, while the various exemplary embodiments are primarily described in the context of autonomous vehicles, it should be understood that other types of vehicles are contemplated as well, such as semi-autonomous vehicles and the like. The term "autonomous vehicle" as used herein generally refers to a vehicle configured for unmanned operation, i.e., operation without a human pilot or co-pilot, with some level of autonomy built in, but which may or may not also carry one or more human passengers. Semi-autonomous vehicles are those vehicles that operate to some degree in an autonomous fashion. For example, a semi-autonomous vehicle may be one which is capable of receiving remote instructions (e.g., via a wireless connection) from a person to operate the vehicle in certain situations such as when the vehicle can no longer operate autonomously for some reason.

It should be appreciated that the vehicles, control systems, features, advantages, and any other subject matter described in: (1) U.S. Pat. No. 6,922,615, entitled "Turret Envelope Control System and Method for a Fire Fighting Vehicle," issued on Jul. 26, 2005, (2) U.S. Pat. No. 6,885,920, entitled "Control System and Method for Electric Vehicle," issued on Apr. 26, 2005, (3) U.S. Pat. No. 6,882,917, entitled "Steering Control System and Method," issued on Apr. 19, 2005, (4) U.S. Pat. No. 6,421,593, entitled "Military Vehicle having Cooperative Control Network with Distributed I/O Interfacing," issued on Jul. 16, 2002, and (5) U.S. Prov. Pat. App. No. 60/723,363, entitled "Vehicle Control System and Method," filed on Oct. 4, 2005, may be used and/or incorporated with the subject matter described herein. All possible configurations of the subject matter described in these documents and the subject matter described herein is contemplated and hereby expressly disclosed. For example, any of the vehicles or any portion of any of the vehicles (e.g., vehicle control systems, components for vehicle control systems, etc.) in these documents with their various configurations, control systems, features, and components may be combined with all or any part of the subject matter described herein. The documents (1)-(5) listed in this paragraph are hereby incorporated by reference herein in their entireties as if the entire contents of these documents were reproduced herein.

Figure 1:
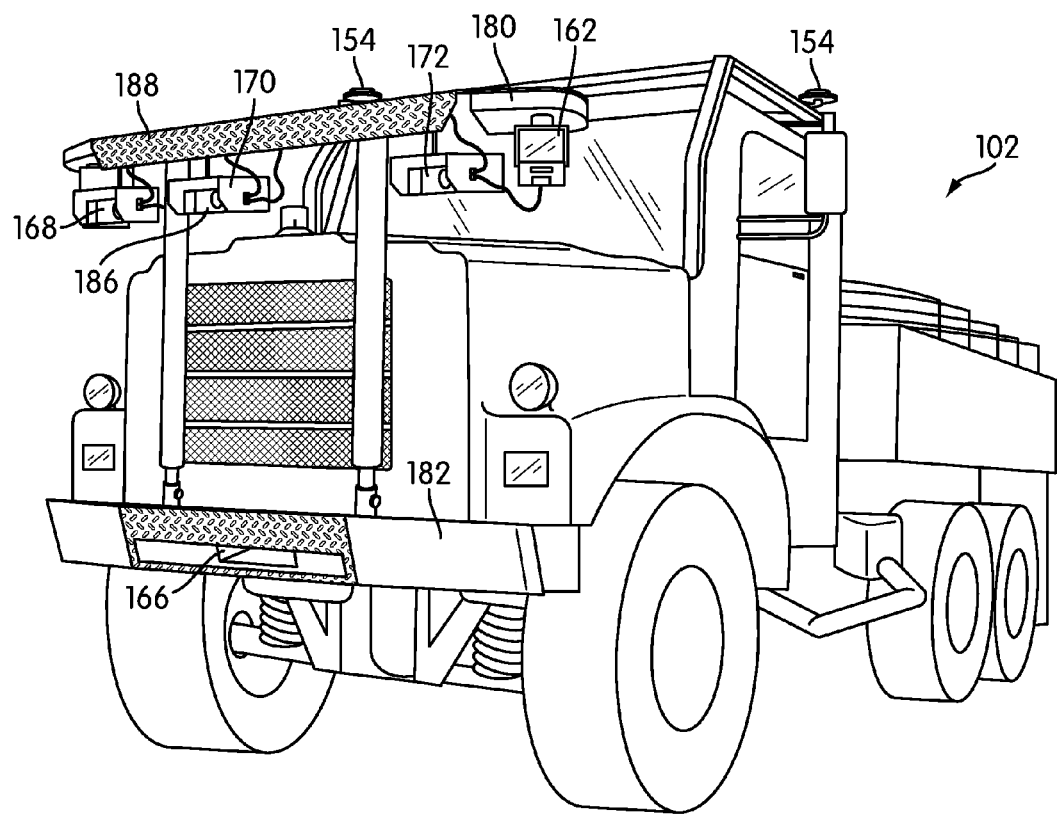
FIG. 1 is a perspective view of one embodiment of a vehicle that is autonomous and/or semi-autonomous.

Referring to FIG. 1, one embodiment of an autonomous vehicle 102 is shown. The vehicle 102 is a tactical wheeled vehicle that may be used in a military context to transport troops, supplies, or any other goods. The vehicle 102 has eighteen inches of ground clearance and is capable of traversing rugged terrain. The vehicle 102 may have features such as all-wheel drive, all-wheel steering, independent suspension (all or some of the wheels), and a central tire inflation system. Many of these features make it easier for the vehicle 102 to operate autonomously. For example, since the vehicle 102 is relatively large, the addition of all-wheel steering allows the vehicle 102 to maneuver quickly and with more agility to avoid obstacles, pass through tunnels, etc. Also, the central tire inflation system may be used to help the vehicle 102 get unstuck by reducing the air pressure in the tires and thereby increasing the fraction of the vehicle 102.

The vehicle 102 may also be configured to handle about 60% grades and about 30% side slopes while the vehicle 102 is fully loaded. The vehicle 102 may be capable of carrying about a seven ton payload off-road and about a fifteen ton payload on-road. The vehicle 102 may also be capable of fording five feet of water, traveling up to and above about 65 miles per hour, and cruising for a range of about 300 miles or more.

The vehicle 102 may be provided in a dump truck configuration where the bed pivots upward to unload material in the bed of the truck. The vehicle 102 may also be configured as a wrecker vehicle that is capable of towing disabled vehicles such as tanks or other trucks to be repaired. The vehicle 102 may also include a flat bed and an articulated lifting system. The lifting system may be configured to move supplies or other goods onto the flat bed. The lifting system folds up near the end of the bed in a stowed position while the vehicle 102 is traveling. The vehicle 102 may include a load handling system that is capable of receiving and securely transporting standard or custom sized shipping containers. In one embodiment, the vehicle 102 may be the medium tactical vehicle replacement (MTVR) manufactured by Oshkosh Corporation, located in Oshkosh, Wis. The vehicle 102 may include any of the various commercial embodiments of the MTVR such as the cargo truck embodiment (regular and extended), dump truck embodiment, wrecker embodiment, HIMARS resupply vehicle embodiment, tractor embodiment, and/or load handling system embodiment.

In a military context, there are some challenges to and advantageous of using an autonomous vehicle. For example, one of the challenges is that many of the technologies used to sense the terrain around the vehicle rely on the transmission of electromagnetic radiation (e.g., LIDAR, radar). The radiation can be detected by the enemy and used as a signal to guide bombs or other munitions to the autonomous vehicle. Also, the enemy may be able to jam the signals and cause the vehicle to crash or otherwise be disabled. The principle advantage of an autonomous vehicle in a military context is that fewer people need to be put in danger in order to transport supplies and goods.

Although the vehicle 102 is described in the context of a military vehicle, it should be appreciated that the subject matter described herein may be used with any of a number of suitable vehicles regardless of whether they are civilian or military vehicles, heavy duty or light duty vehicles, or large or small vehicles. For example, the subject matter described herein may be used with the firefighting vehicles described in some of the documents that are incorporated by reference above.

The vehicle 102 may be configured to be easily switched from manual operation to autonomous operation. The switchover may be as simple as pressing a button or may involve some amount of mechanical or electrical reconfiguration. Allowing the vehicle 102 to be used in both manual and autonomous mode increases the usability of the vehicle 102. For example, in a military context, if the vehicle 102 is inoperable in autonomous mode due to enemy fire, the vehicle 102 may still be capable of being operated manually. Also, the vehicle 102 may be capable of being operated by an operator until the vehicle 102 enters a dangerous area (e.g., vehicle approaches the enemy, vehicle enters a hazardous waste area) at which point the vehicle may be operated autonomously.

Figure 2:
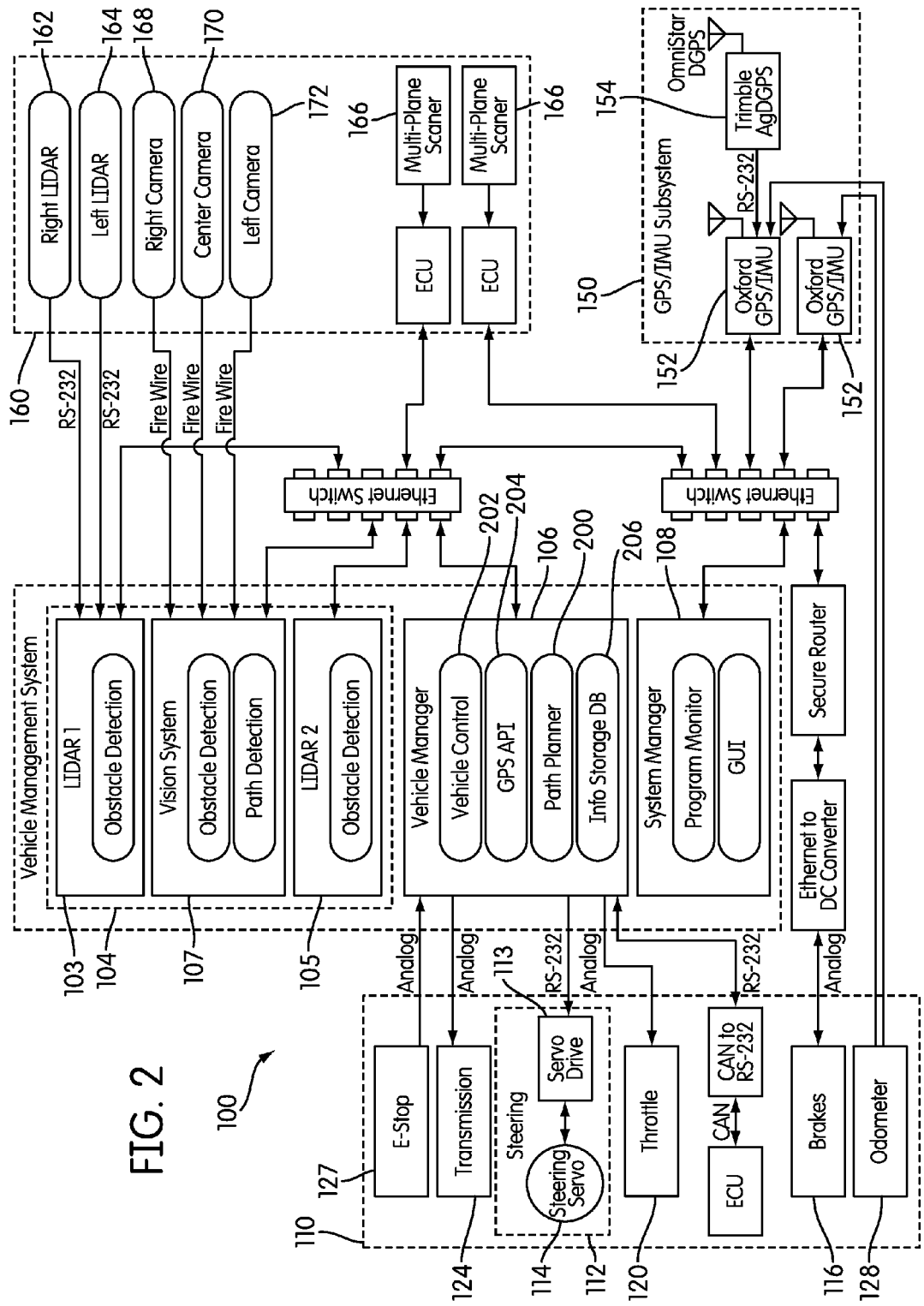
FIG. 2 is a block diagram schematically illustrating a vehicle control system according to an exemplary embodiment.

FIG. 2 is a block diagram schematically illustrating a vehicle control system 100 for use with the vehicle 102 according to an exemplary embodiment. The vehicle control system 100 may include a terrain detection system 104, a vehicle management system 106, and a system manager 108. The vehicle control system 100 also includes a plurality of vehicle subsystems 110, position sensors 150, and terrain sensors 160. The vehicle control system 100 is generally configured to acquire and process vehicle position information and terrain information from the position sensors 150 and the terrain sensors 160 to control the vehicle 102 autonomously.

Figure 9:
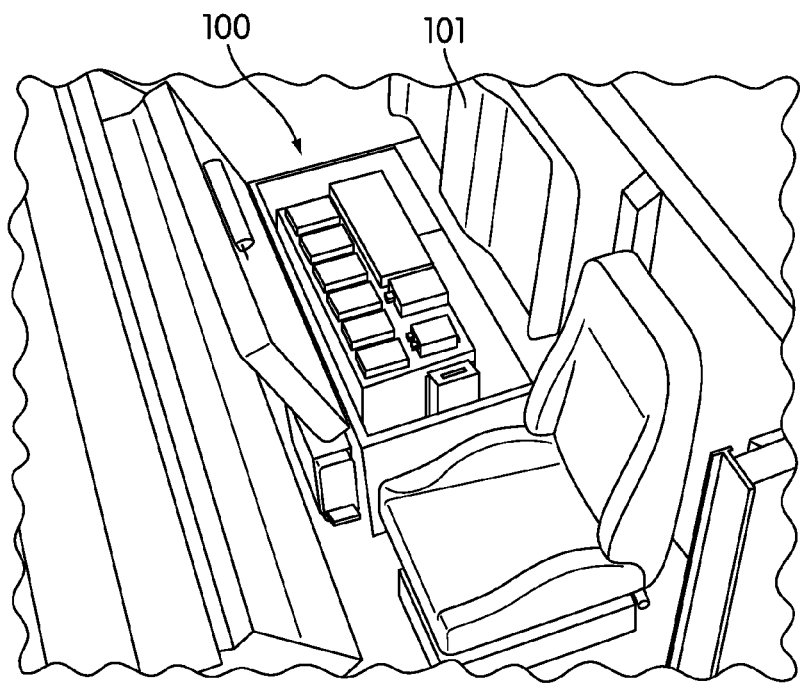
FIG. 9 is a perspective view of the interior of another embodiment of an autonomous and/or semi-autonomous vehicle showing at least a portion of the hardware for the vehicle control system positioned under the passenger seat.

Referring to FIG. 9, certain hardware components of the vehicle control system 100 may be positioned under the passenger seat 101 of the vehicle 102. The hardware components may be packaged in a shock absorbing rack that fits inside the passenger seat 101. In one embodiment, the vehicle 102 may include a temperature control system that is configured to heat and/or cool the hardware components. For example, the vehicle 102 may be configured to air condition the space under the passenger seat 101 to prevent the microprocessors from overheating. The vehicle 102 may be configured to heat and/or cool the space that contains the hardware components using the heating and cooling systems used to control the climate in the cab of the vehicle 102.

The terrain detection system 104 is used to detect obstacles around the vehicle 102 (e.g., rocks, sudden drop-offs, trees, and so forth) and/or detect a path for the vehicle 102 to travel (e.g., detect a road). The terrain detection system 104 receives and analyzes input from the terrain sensors 160 to identify obstacles and a path for the vehicle 102 to follow. Terrain data from the various terrain sensors 160 is merged into a single database that is used to plan the path of the vehicle 102.

The terrain detection system 104 includes a first LIDAR system 103, a second LIDAR system 105, and a vision system 107. The first LIDAR system 103 receives input from two single-plane LIDAR sensors 162, 164 coupled to the vehicle 102. The second LIDAR system 105 receives input from two multi-plane LIDAR sensors 166 coupled to the vehicle 102. The vision system 107 receives input from three cameras 168, 170, 172 coupled to the front of the vehicle 102. It should be appreciated that the number, configuration, and types of terrain sensors used to provide input to the terrain detection system 104 may be varied widely. For example, the terrain detection system may include a radar system, or may include additional LIDAR systems, or may include a rotating array of LIDAR sensors to provide a 360° view of the surrounding terrain. Likewise, the terrain sensors 160 may include a radar antenna, various cameras (still and/or video cameras), and multiple LIDAR sensors (e.g., single plane or multi-plane LIDAR systems). Also, the vehicle 102 may include any of these sensors in any configuration coupled to the rear of the vehicle 102 to facilitate operation of the vehicle 102 in reverse.

Figure 12:
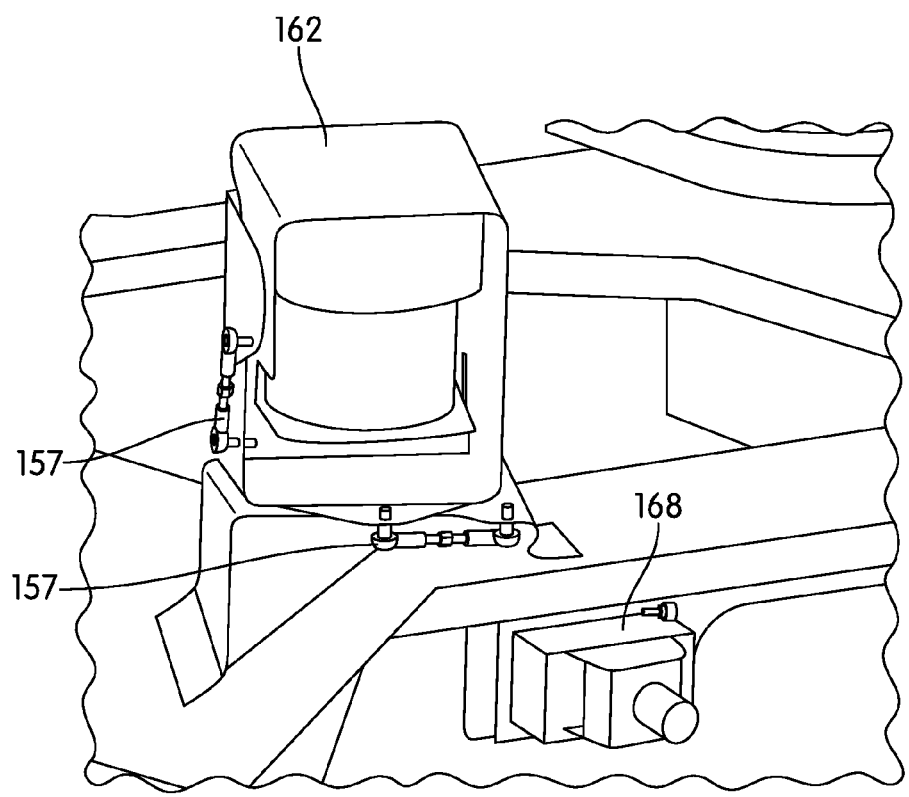
FIG. 12 is a perspective view of the vehicle in FIG. 10 showing sensors coupled to the cab of the vehicle.

The terrain sensors 160 may be mounted to the vehicle 102 using any suitable mounting structure. For example, as shown in FIG. 12, the terrain sensors 160 may be mounted to the vehicle using telescopically adjustable mounts 157 that move in and out via a threaded engagement system. The adjustable mounts 157 allow for precise adjustment of the terrain sensors 160 but also keep the terrain sensors 160 in a fixed position after the adjustment has been performed. The adjustable mounts 157 may be used to hold any of the terrain sensors 160 and/or position sensors 150 in place. The terrain sensors 160 and/or position sensors 150 may be coupled to a roll bar or roll cage 180 of the vehicle. The roll bar may also serve as a protective conduit for the sensor communication wires and power wires to travel.

Figure 3:
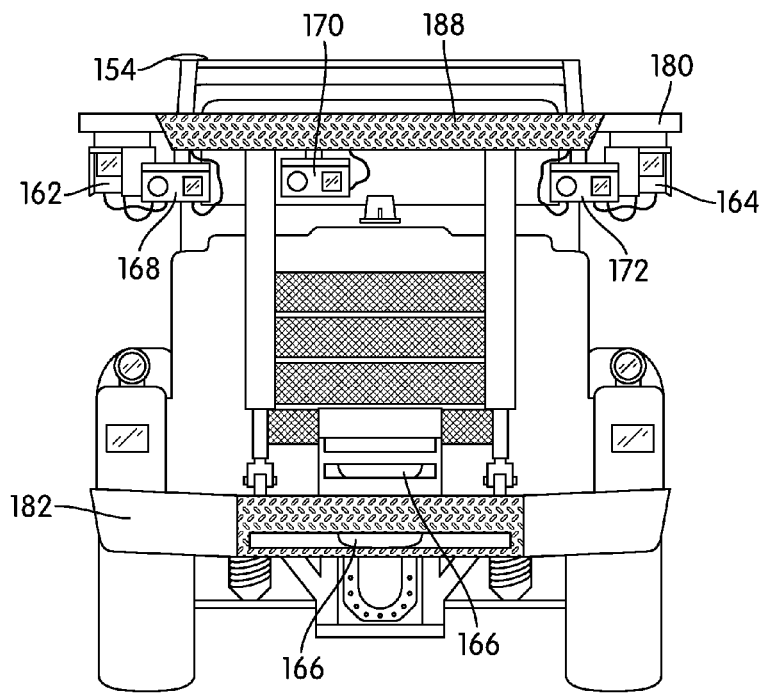
FIG. 3 is a front view of another embodiment of an autonomous and/or semi-autonomous vehicle.
Figure 4:
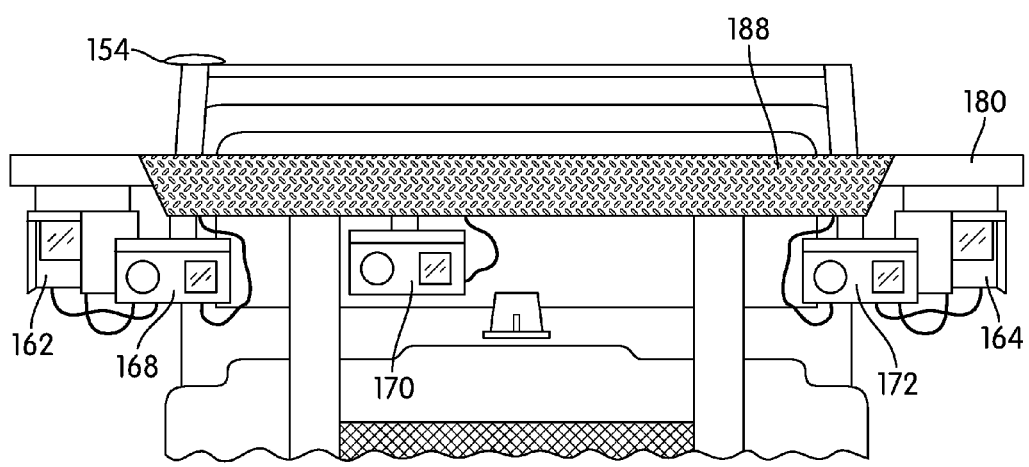
FIG. 4 is a front view of the vehicle in FIG. 3 which shows some of the sensors coupled to the roll cage and/or on or near the cab of the vehicle.

As shown in FIGS. 3-4, the LIDAR sensors 162, 164 are coupled to the outside edges of the roll bar 180 at the front of the vehicle 102. The LIDAR sensors 162, 164 are positioned so that they point about 10 degrees down and about 25 degrees outward to the side of the vehicle 102. Positioning the LIDAR sensors 162, 164 in this fashion provides good coverage of the terrain to the front and the side of the vehicle 102. This allows the vehicle 102 to make tight turns while still having some information regarding the terrain in the direction that the vehicle 102 is turning. It should be appreciated that the LIDAR sensors 162, 164 may be positioned at any suitable position to provide the most useful information to the vehicle control system 100. To some extent, the orientation of the LIDAR sensors 162, 164 depends on the type of vehicle being used (e.g., taller vehicles may require the LIDAR sensors to be pointed down more). The LIDAR sensors 162, 164 may be configured to be positioned about 0 to 20 degrees down and about 0 to 90 degrees outward to the side of the vehicle 102. Also, the LIDAR sensors 162, 164 may be configured to scan a 100 degree scan area with a 1 degree resolution. Suitable LIDAR sensors may be obtained from SICK, having an office in Minneapolis, Minn., as model number SICK LMS-291.

The first LIDAR system 103 may be configured to detect positive obstacles (e.g., obstacles that protrude upward) and negative obstacles (e.g., road edges, cliffs, etc.). The positioning of the LIDAR sensors 162, 164 should allow for detection of both positive and negative obstacles. The first LIDAR system 103 processes the scan data from the LIDAR sensors 162, 164 to identify positive and negative obstacles. Positive obstacles may be detected by translating the raw scan data from a sensor level coordinate framework to a local level coordinate framework and comparing the relative heights of neighboring scan points. A history of scan data can be used to effectively map the surface in front of the vehicle 102. An obstacle is identified if the surface as detected by the LIDAR sensors 162, 164 protrudes upward above a threshold amount. The detection threshold may be set at a minimum obstacle height based on the capabilities of the vehicle 102. For example, the vehicle 102 as shown in FIG. 1 may be configured to have a detection threshold of about eighteen inches since the vehicle 102 can drive over any obstacle that is under eighteen inches. A convex hull algorithm may be used to define the outermost edge of the obstacle. Once the obstacle and its outermost edges have been identified, the vehicle control system 100 can store the obstacle in the database.

The first LIDAR system 103 may detect negative obstacles in a manner that is similar to detecting positive obstacles. The data map of the surface in front of the vehicle 102 may be searched using an algorithm that identifies any negative height discontinuities. Any identified negative height discontinuities are evaluated further to determine if the edge of the discontinuity is a continuation of a previously detected edge.

It should be appreciated that many aspects related to the first LIDAR system 103 and the single-plane LIDAR sensors 162, 164 may be modified in a variety of ways. For example, instead of using single-plane LIDAR sensors, multi-plane LIDAR sensors may be used. Also, more or less than two LIDAR sensors 162, 164 may be used (e.g., one or more additional LIDAR sensors may be coupled to the rear of the vehicle 102 to assist with backing the vehicle 102). The LIDAR sensors 162, 164 may be coupled to the vehicle at any suitable location such as the cab, fender, and so forth.

Figure 5:
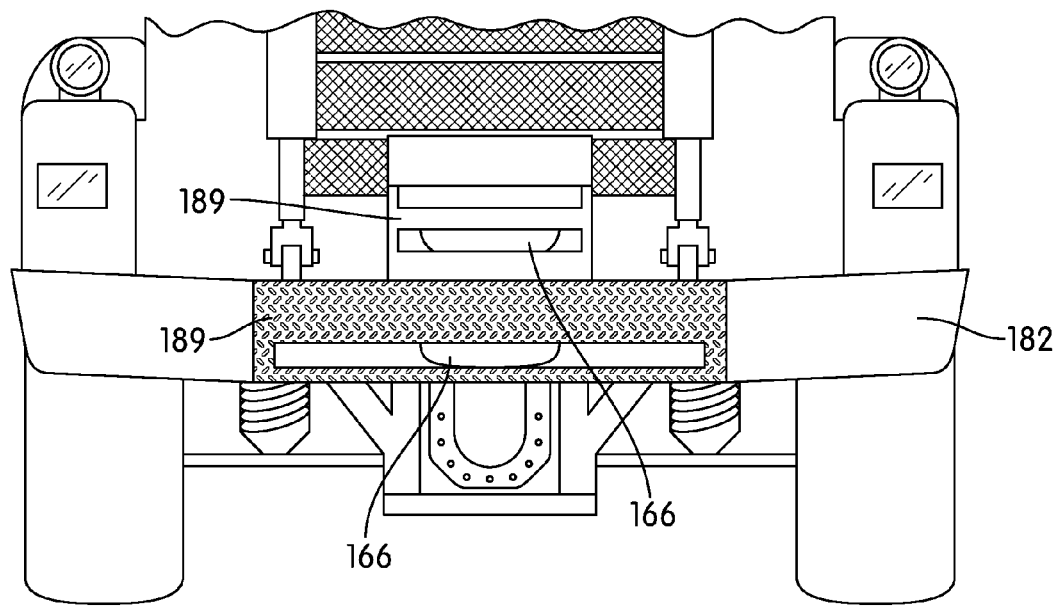
FIG. 5 is a front view of the vehicle in FIG. 3 which shows some additional sensors positioned near the bumper of the vehicle.
Figure 6:
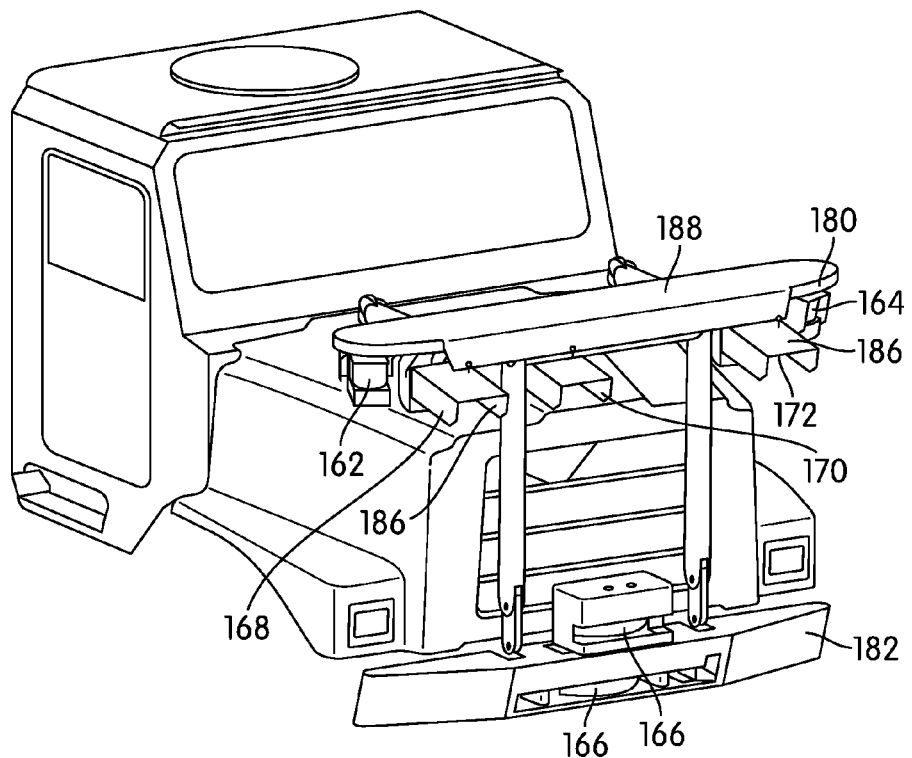
FIG. 6 is a perspective view of another embodiment of an autonomous and/or semi-autonomous vehicle showing sensors positioned near the roll cage and the bumper.
Figure 7:
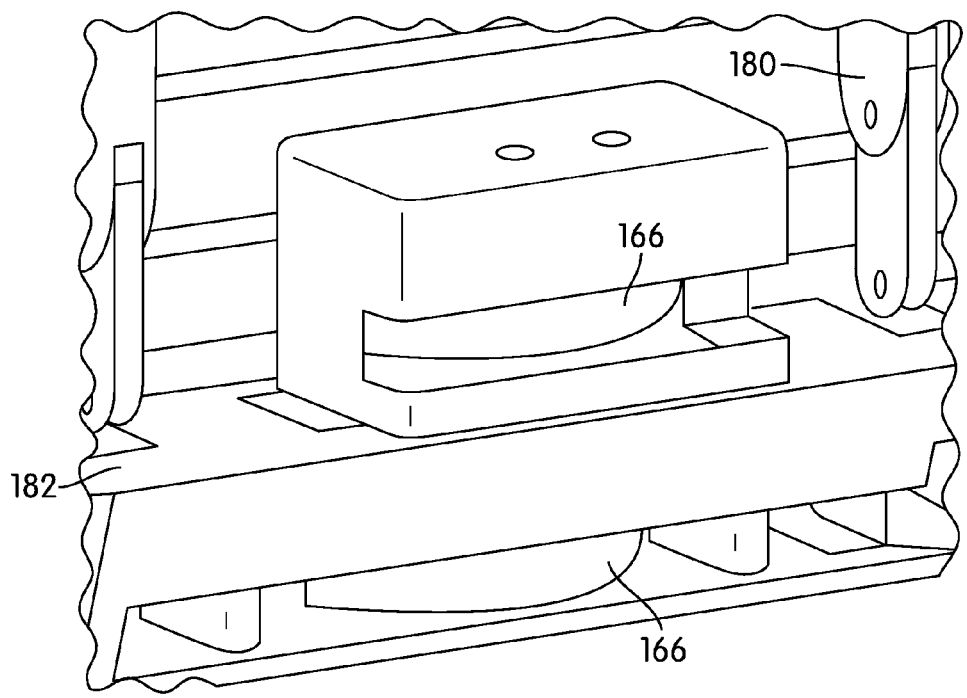
FIG. 7 is a perspective view of the vehicle in FIG. 6 showing two LIDAR sensors coupled to the bumper of the vehicle.
Figure 8:
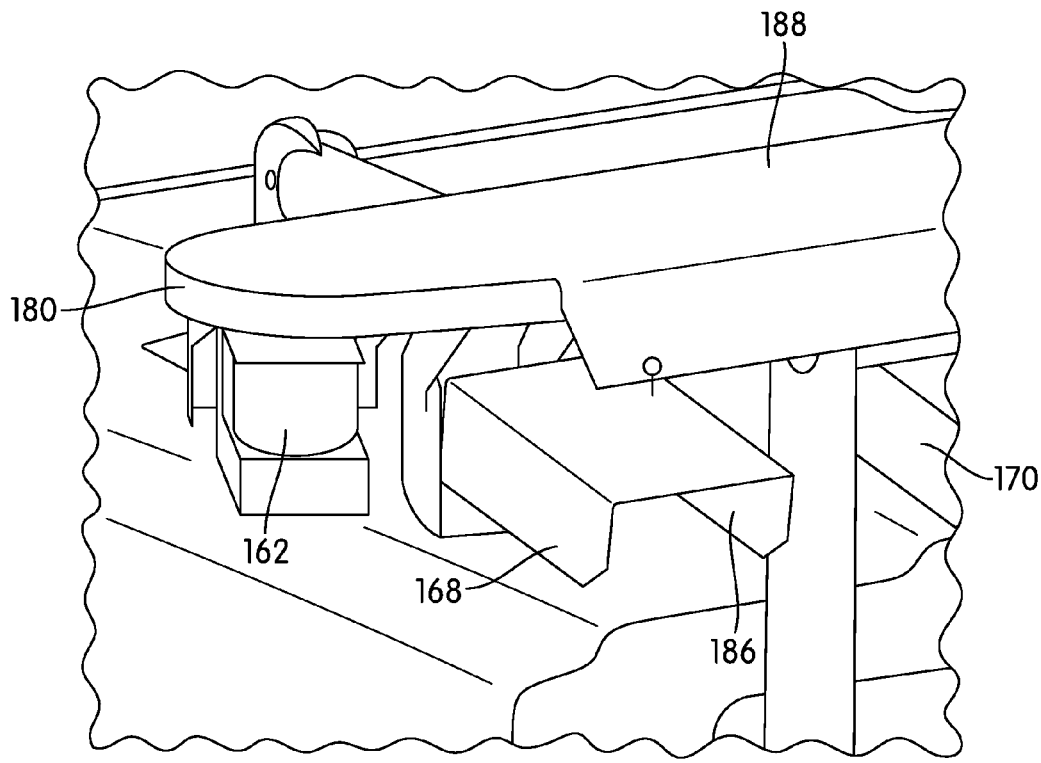
FIG. 8 is a perspective view of the vehicle in FIG. 6 showing a LIDAR sensor and a camera coupled to the roll cage of the vehicle.

Referring to FIGS. 3, 5, and 7, the multi-plane LIDAR sensors 166 used with the second LIDAR system 105 are coupled to the vehicle 102 near the bumper 182. Each of the LIDAR sensors 166 are four plane scanner devices that are used primarily for positive obstacle detection at long and close range. Each LIDAR sensor 166 is positioned horizontally so that two planes scan toward the ground and two planes scan toward the sky. Desirably, the LIDAR sensors 166 each have a range of about 80 meters, a resolution of about 0.25 degrees, and a 170 degree scan area. The large scan area allows the LIDAR sensors 166 to be used to identify obstacles around upcoming turns.

As shown in FIG. 1, the vehicle 102 may be configured to include only a single LIDAR sensor 166. However, it may be desirable to include at least two LIDAR sensors 166 so that in case one of the LIDAR sensors 166 is damaged or otherwise unable to be used, the remaining LIDAR sensor 166 can still provide information to the vehicle control system 100.

The second LIDAR system 105 is configured to receive scan data from the LIDAR sensors 166 and identify obstacles by searching for large positive slopes in the scan data. The obstacle detection algorithm used to process the scan data in the first LIDAR system 103 is similar to the obstacle detection algorithm used to process the scan data in the second LIDAR system 105. In one embodiment, the same algorithm may be used to process scan data from both sources. The second LIDAR system 105 may be configured to translate the scan data from the coordinate frame of the particular LIDAR sensor 166 to a local level coordinate frame and stored in the database. Since the LIDAR sensors 166 are multi-plane devices, the scan data from each plane may be compared to each other to aid in detecting obstacles and false positives. Since the scan data has been translated into a local level coordinate frame, the position of obstacles identified in the scan data from the LIDAR sensors 166 can be compared to the position of obstacles identified using the other terrain sensors 160 and to the position of the vehicle 102.

The LIDAR sensors 162, 164 and the LIDAR sensors 166 may be configured to scan the same area or different areas in front of the vehicle 102. In one embodiment, the LIDAR sensors 162, 164, 166 are used to scan overlapping areas in front of and to the side of the vehicle 102. In another embodiment, the LIDAR sensors 162, 164 may be configured to scan for obstacles that are 0 to 20 meters in front of the vehicle 102 and the LIDAR sensors 166 may be configured to scan for obstacles that are 20 to 60 meters in front of the vehicle 102. Obstacles detected by the LIDAR sensors 162, 164, 166 may be put into an obstacle database that the vehicle control system 100 uses to plan the path of the vehicle 102.

The vision system 107 may be based on a multi stereoscopic vision system. The vision system 107 receives input from the cameras 168, 170, 172, which are coupled to a horizontal portion of the roll bar 180. The cameras 168, 170, 172 are coupled to the vehicle 102 in a secure manner to prevent the cameras from becoming dislodged during operation of the vehicle 102. This may especially be a problem when the vehicle 102 operates in an off-road environment.

The cameras 168, 170, 172 are coupled to the vehicle 100 so that they are asymmetrically spaced apart from each other. As shown in FIG. 4, the cameras 168, 172 are positioned about 1.5 meters apart from each other while the camera 170 is positioned about 0.5 meters from the camera 168. In one embodiment, the cameras 168, 170, 172 may be video cameras that transmit images using ordinary light to the vision system 107. In another embodiment, the cameras 168, 170, 172 may be still cameras that periodically take pictures at the same time. The pictures may be transmitted to the vehicle control system 100 where the pictures are processed to identify obstacles and/or find a path for the vehicle 102. In yet another embodiment, the cameras 168, 170, 172 may be infrared cameras (either video or still). In yet another embodiment, the cameras 168, 170, 172 may be video cameras capable of providing video streams at 10 Hz (640×480, color with Bayer pattern).

The orientation of the cameras 168, 170, 172 may be calibrated using a graduated grid. This may be done to fix the three degrees of freedom specifying the cameras orientation to known values. In one embodiment, the yaw and roll angles of the cameras 168, 170, 172 are fixed at zero. This may help to reduce the processing requirements of the images taken by the cameras 168, 170, 172. The pitch angle of the cameras 168, 170, 172 may be chosen so that the cameras 168, 170, 172 frame a small portion over the horizon (to limit direct sunlight) and frame the terrain at about four meters from the vehicle 102. FIGS. 18-23 show images taken with the pitch of the cameras 168, 170, 172 being adjusted in this manner.

It should be appreciated that the cameras 168, 170, 172 may be coupled to the vehicle 102 in any suitable fashion and location. For example, additional cameras may be coupled to the rear and side of the vehicle 102 to facilitate backing and turning of the vehicle 102. Also, the pitch, yaw, and roll of the cameras 168, 170, 172 may be adjusted in any suitable fashion.

As shown in FIG. 2, the cameras 168, 170, 172 send three video streams to the vision system 107 via fire wire connections. The vision system 107 selects which stereo pair of video streams to use depending on the speed of the vehicle 102. By selecting different pairs of cameras, the vision system 107 can obtain images from stereo pairs of cameras having different baselines (i.e., the distance between the cameras). It is desirable to have the ability to vary the baseline because when the baseline is wider, the vision system 107 is able to more accurately determine the distance to an object, but as the baseline increases, it makes it more difficult to stereo match objects (especially close objects) in the images because the objects are viewed at very different angles. Therefore, the vision system 107 is configured to receive the video streams from cameras 168, 172 when the vehicle 102 is traveling at high speeds so that the vision system 107 can accurately identify and measure the distance of obstacles that are a long distance away. When the vehicle 102 is traveling at medium speeds and obstacles are not approaching as quickly, the vision system 107 is configured to receive the video streams from cameras 170, 172. Likewise, when the vehicle 102 is traveling at slow speeds, the vision system 107 is configured to receive the video streams from cameras 168, 170 in that order. This configuration allows the vision system 107 to obtain images from cameras having a wide baseline when the vehicle 102 is moving at high speeds, obtain images from cameras having a medium baseline when the vehicle 102 is moving at medium speeds, and obtain images from cameras having a short baseline when the vehicle 102 is moving at slow speeds.

The use of at least three cameras 168, 170, 172 fixed in position provides a mechanically robust system that is capable of providing images from different combinations of the cameras 168, 170, 172. In other embodiments, the vision system 107 may be configured to receive input from two cameras where at least one of the cameras rotates and tilts as the speed of the vehicle 102 changes instead of using the three camera configuration. The moving cameras provide more accurate distance estimation and better object matching versus a two camera configuration where the cameras do not move. However, the configurations that use at least three fixed cameras are preferred since they allow the vision system 107 to receive different combinations of video streams from cameras having different baselines and they do not rely on movement of the cameras—an area that is more prone to failure and/or that may introduce variations in the video streams.

It should be appreciated that the vehicle control system 100 may include additional LIDAR systems or may combine the first LIDAR system 103 and the second LIDAR system 105 into a single LIDAR system. It should also be appreciated that the data from the LIDAR and vision systems may be processed by a single processor and/or single software program. It should also be appreciated that in other embodiments, the data from each LIDAR system and vision system may be initially processed using a separate system. The output from each system may then be compared to create a database of obstacles. It should also be appreciated that each of these systems may be provided as a separate module that may optionally be included with the vehicle control system 100. Providing each system as a separate module may allow for greater flexibility in selecting the components of the vehicle control system 100 to use with a particular type of vehicle.

The vision system 107 may be used to detect obstacles and detect a path of travel for the vehicle 102. The images provided by the video streams are subjected to V-disparity image analysis to determine the average terrain slope in front of the vehicle 102. Slope information is then used for both obstacle detection and path detection. Any significant deviation from the average smooth slope detected previously is identified as an obstacle. The exact location of the obstacle is then obtained via stereo triangulation between the two views of the obstacle. This method provides a fairly precise position of the obstacle.

However, the vehicle control system 100 may also compare the position of the obstacle as determined by the vision system 107 with the position of the obstacle as determined by the first LIDAR system 103 and/or the second LIDAR system 105 to provide an even more accurate position of the obstacle.

This method allows the vision system 107 to detect thin vertical posts such as fence posts. Although the vision system 107 may be capable of detecting small obstacles, the vision system 107 may be tuned with high thresholds to reduce the number of false positives. In other words, the capability of detecting small obstacles may be traded for a higher robustness of detection.

FIGS. 16-19 show pictures highlighting obstacles detected by the vision system 107. Each of FIGS. 16-19 includes two pictures—the one on the left is the image before the obstacles are detected and the one on the right is the same image with the obstacles highlighted. The different colors of the obstacles represent the distance to the obstacle from the vehicle 102 (orange are the closest, red the next closest, and purple are the farthest). As shown in FIGS. 16-19, posts and thin poles are detected by the vision system 107.

The vision system 107 also uses image disparity analysis as the initial step in detecting a path for the vehicle 102 to travel. Image disparity analysis is used to compute the area in front of the vehicle 102 which features a smooth slope, which is known as the free-space. Free space is obtained using standard image warping to localize deviations from a smooth road surface. FIGS. 20A-20C show the left image, the warped right image, and the matching cluster representing free space.

The vision system 107 combines the free space with other features of the images such as similarity in texture, similarity in color, and/or similarity in shape to construct a representation of a path to follow. The path detection algorithm of the vision system 107 is also configured to indicate whether the path is straight so that the vehicle 102 may increase speed. When a curved path is present, the vehicle 102 is configured to slow down.

Figure 21:
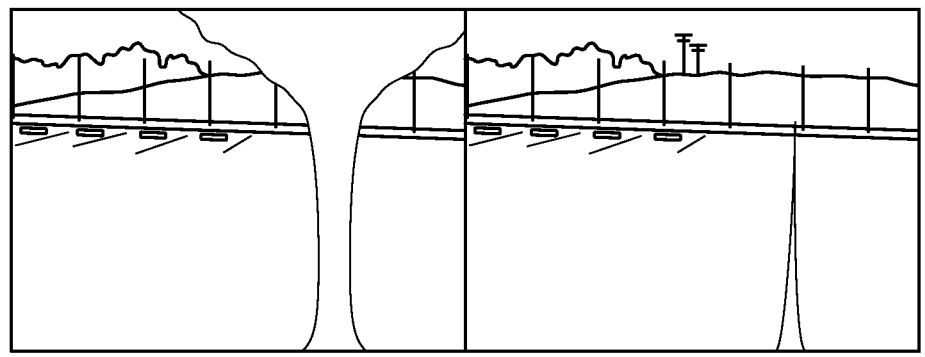
FIGS. 21-23 are a series of pictures that show the ability of the vision system to detect obstacles in adverse lighting conditions.
Figure 22:
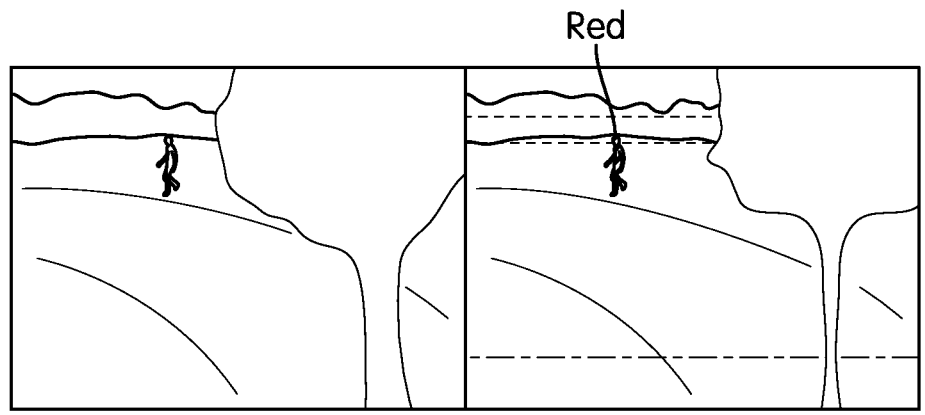
Figure 23:
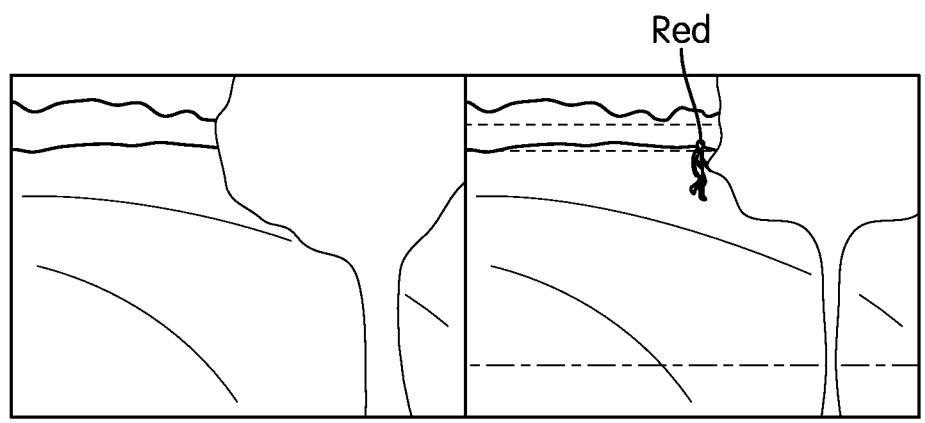

The cameras 168, 170, 172 may be configured to compensate for different light levels using automatic gain control, which allows the cameras 168, 170, 172 to sense the environment including direct sunlight into the cameras 168, 170, 172. FIGS. 21-23 show examples of images captured with and without gain control. FIGS. 22-23 show the result of obstacle detection by the vision system 107 in bad light conditions. As shown in FIGS. 22-23, obstacles may still be detected up until they enter the oversaturated area. The cameras 168, 170, 172 may also be provided with sun shades 186, which reduce the amount of direct sunlight that hits the cameras 168, 170, 172 to avoid oversaturation and reflections due to dirty glass. The vehicle 102 may also include shields or reflectors 188 that reflect sunlight away from the area of the cameras 168, 170, 172 and the LIDAR sensors 162, 164 to prevent these devices from becoming too hot. In one embodiment, the shield 188 is a reflective diamond plating material (e.g., aluminum or steel). Additional shields 189 may be provided in the vicinity of the LIDAR sensors 166.

The vehicle 102 may include a cleaning system that is configured to clean the lenses on the cameras 168, 170, 172 and/or the lenses of the LIDAR sensors 162, 164, 166. The cleaning system may include one or more nozzles that are aimed at the lenses. The nozzles may be configured to dispense any suitable gas or liquid onto the lens to clean it. In one embodiment, the cleaning system may be configured to include an air knife that directs high velocity bursts of air onto the lenses to remove any dust or other debris. The use of air may be desirable since liquids may attract dust and dirt and/or leave spots on the lenses. In another embodiment, the cleaning system may be configured to direct water or another liquid (e.g., windshield washer fluid, and so forth) towards the lens. The cleaning system may then direct air over the lens to quickly dry the lens and remove the water. The air may be supplied by a compressed air system that is included as part of the vehicle 102. In another embodiment, the cleaning system may comprise a cleaning controller, one or more valves (e.g., an array of valves), and a washer tank. The cleaning controller may be configured to electronically control the valves to direct liquid and/or air through the nozzles and onto the lenses.

The vehicle management system 106 includes a path planning module 200, a vehicle control module 202, a navigation module 204, and an information database 206. The vehicle management system 106 is configured to receive input from the terrain detection system 104 and control the vehicle 102 to reach a desired location. The vehicle management system 106 may also include a modeling and simulation system that is used to determine the capabilities of the vehicle 102 under different circumstances. The modeling and simulation system may be similar to that described in U.S. Prov. Pat. App. No. 60/723,363, entitled "Vehicle Control System and Method," filed on Oct. 4, 2005, which is hereby incorporated herein by reference in its entirety.

The navigation module 204 may be configured to compute the present position of the vehicle 102 and perform dead reckoning navigation. Dead reckoning navigation may be needed when the vehicle 102 is unable to receive GPS signals (e.g., when the vehicle 102 is in a tunnel, etc.). The navigation module 204 may also include navigation related information such as maps (e.g., road maps, topographical maps, and the like), aerial photographs, a list of GPS waypoints, and the like. This information may be utilized by the navigation module 204 to drive the vehicle 102 to its destination. In one embodiment, each mission may be planned out by setting a plurality of GPS waypoints and a preferred path of travel that the vehicle 102 should take until it reaches its final destination. The GPS waypoints and preferred path may be loaded into the navigation module 204 prior to the vehicle 102 embarking on the mission. During the mission, the vehicle control system 100 is configured to drive the vehicle to successive waypoints while trying to stay on the preferred path as much as possible while still avoiding any obstacles that may present themselves.

The navigation module 204 receives input from the position sensors 150. In the embodiment shown in FIG. 2, the position sensors 150 include dual GPS/inertial measurement units (IMU) 152 and a differential GPS unit 154. The GPS/IMU units 152 may include a six-axis inertial measurement system which includes three angular rate sensors (gyros) and three accelerometers. The three accelerometers are all mounted at 90 degrees to each other, and the three angular rate sensors are mounted at the same angles as their respective accelerometers. Together they give full 3D motion measurement of the vehicle 102. The GPS/IMU units 152 are also capable of receiving GPS signals directly from GPS satellites and differential GPS information from the differential GPS unit 154. The information provided to the navigation module 204 is used to chart the course of the vehicle 102 at a high level. The vehicle 102 attempts to follow the course as much as possible while avoiding obstacles and attempting to stay on a road or other path.

Input from the inertial measurement system may be used by the vehicle control system 100 to perform dead reckoning navigation. The inertial position information provided to the vehicle control system 100 may be supplemented with other data such as wheel speed and time traveled (e.g., to determine the distance traveled during dead reckoning navigation), wheel speed and steering angle (e.g., to determine the direction the vehicle 102 is going during dead reckoning navigation), or any other information that may be useful to determine the position of the vehicle 102. Also, the inertial position information may be used to measure the pitch and roll of the vehicle 102. In one embodiment, the vehicle control system 100 may be configured to perform dead reckoning navigation using sensed wheel speed and wheel angle for those situations where the GPS and IMU units are not operational. The GPS/IMU units 152 may be positioned on the approximate centerline of the vehicle 102 (e.g., in the floor of the cab). In one embodiment, the GPS/IMU units 152 may be obtained from Oxford Technical Solutions, Ltd., having an office in Dearborn, Mich., as part number OXTS RT3100.

In the embodiment shown in FIG. 2, the vehicle 102 includes two GPS/IMU units 152. Two of the units 152 may be provided so that the position information (both GPS and inertial) received from each unit can be averaged to provide a more accurate and robust calculation of the position of the vehicle 102. Also, if one of the GPS/IMU units 152 fails, the remaining GPS/IMU unit 152 could still be used to provide position information to the vehicle control system 100. The vehicle control system 100 may be able to determine that one of the GPS/IMU units 152 has failed when, for example, the unit 152 stops providing input or the input is so different from the position information provided by the other position sensors 150 and terrain sensors 160 that the input can no longer be trusted. If the vehicle control system 100 determines that one of the GPS/IMU units 152 has failed, the vehicle control system 100 uses the remaining GPS/IMU unit 152.

The differential GPS unit 154 is configured to receive differential corrections and send them to the GPS/IMU units 152. The differential GPS unit 154 may be configured to receive Beacon, SBS/WAAS, and/or Omnistar corrections, as well as any other suitable corrections. It should be appreciated that the combination of GPS units may be varied widely. For example, the GPS/IMU units 152 may be capable of receiving the differential corrections directly without using a separate receiver. Likewise, the GPS/IMU units 152 may be split into two units so that the GPS unit is separate from the IMU unit.

The vehicle control module 202 is configured to interface with the vehicle subsystems 110 to allow the vehicle components to be controlled by the vehicle management system 106. As shown in FIG. 2, the vehicle subsystems 110 may include a steering system 112, a braking system 116, a throttle system 120, and a transmission system 124.

The steering system 112 may include a servo drive 113 and a corresponding servomotor 114 that is in communication with the servo drive 113. The servo drive 113 may be configured to receive and process position commands from the vehicle control system 100 and provide corresponding outputs (e.g., an analog voltage or current) to the servomotor 114. In response, the servomotor 114 may drive one or more associated wheels of the vehicle 102 to a desired steering angle. The steering system 112 may also include one or more wheel angle sensors that are used to determine the steering angle of a wheel of the vehicle 102 and provide feedback to the vehicle control system 100 as to the current steering angle of the wheel. In another embodiment, the servomotor 114 may include an integrated high-resolution encoder that is used to control the steering angle of the vehicle 102. It should also be appreciated that the encoder may be coupled to the steering system 112 at any location that is capable of providing a reliable and accurate measurement of the steering angle of the wheels (e.g., steering column, etc.).

In one embodiment, the servomotor 114 is coupled directly to the steering gearbox of the vehicle 102. The steering gearbox may be configured to have dual inputs so that the servomotor 114 and the hand wheel can both be connected to the steering gear. This allows steering control of the vehicle to be switched between manual mode (operated by a driver) and autonomous mode without disassembling the steering system.

The steering system 112 may also be an all-wheel steering system, or in the case of 6×6 wheeled vehicles, 8×8 wheeled vehicles and so on, the steering system 112 may be configured to steer one, two, three, four, or more sets of wheels. The steering system 112 may be configured similarly to any of the steering systems described in U.S. Pat. No. 6,882,917 (incorporated by reference herein previously).

The braking system 116 may include, for example, an anti-lock brake system including an anti-lock brake control system and anti-lock brakes coupled to one or more wheels of the vehicle 102. The braking system 116 may be configured to receive braking commands, such as a "brake ON" command, from the vehicle control system 100. In response, the braking system 116 may apply braking pressure to one or more wheels of the vehicle 102 to, for example, reduce the speed of the vehicle 102 or bring the vehicle 102 to a stop. According to an exemplary embodiment, braking pressure for the braking system 116 may be provided by a compressed-air system. The compressed-air system may include, for example, an air compressor coupled to the power train of the vehicle 102 (such as via gears, v-belt, etc. to convey rotational mechanical energy to the air compressor to be converted to air pressure), and one or more air pressure tanks for storing compressed air from the air compressor.

It should be noted that for purposes of this disclosure, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature.

As shown in FIG. 2, the vehicle control system 100 may be configured to communicate with the braking system 116 via Ethernet to a proportional voltage to pressure valve. The braking system 116 may be configured to apply the service brakes in an amount that is proportional to the deviation between the actual speed of the vehicle 102 and the desired speed of the vehicle 102. It should be appreciated, however, that numerous other configurations may also be used to control the braking system 116. For example, the vehicle control system 100 may be configured to control the braking system 116 using more mechanical components such as a hydraulic actuator that operates the brakes through the system.

The braking system 116 may also include an engine brake. The braking system 116 in combination with the throttle system 120 may be used to control the speed of the vehicle 102. Typically, the speed of the vehicle 102 is controlled solely using the throttle. However, the service brakes and the engine brake may be used to control the speed of the vehicle 102 on steep grades and/or to manage the speed that the vehicle 102 decelerates.

The throttle system 120 may include an engine control module and a throttle actuator. The engine control module may be configured to receive and process throttle commands from the vehicle control system 100 and provide corresponding outputs (e.g., an analog voltage or current) to the throttle actuator. In response, the throttle actuator may adjust the rotational speed of an engine coupled to the drive train of the vehicle 102 to achieve a desired speed of the vehicle 102. The engine control module may be configured to determine the speed of the vehicle 102 (e.g., using a tachometer feedback signal) and provide feedback to the vehicle control system 100 as to the current speed of the vehicle 102. In other embodiments, the speed of the vehicle 102 may be determined using feedback from the transmission system 124 or by measuring the rotation of a drive shaft, or some other component of the power train of the vehicle 102. In one embodiment, the vehicle control system 100 and/or the engine control module may use a pulse width modulated (PWM) signal to provide very precise control of the throttle.

The throttle system 120 may be configured so that reset conditions to the throttle position are provided for transmission up shift and down shift and to activate the engine brake. Since the engine brakes are typically activated when the engine is idling, throttle position overrides are used whenever the engine brakes are active. Throttle position faders are used to reactivate the throttle position control when the engine brake is disabled.

The transmission system 124 may include the engine control module and a transmission mechanically coupled to the engine of the vehicle 102. In combination, the transmission system 124 and the engine of the vehicle 102 form the power train of the vehicle 102. The engine control module may be configured to receive and process gear change commands from the vehicle control system 100 and provide corresponding outputs (e.g., an analog voltage or current) to the transmission system 124. In response, the transmission may change gears to achieve a desired rotational speed of the power train of the vehicle 102. In another embodiment, the transmission system 124 may include a transmission control module that is separate from the engine control module. The transmission control module may be in communication with the engine control module so that information required for shifting gears and so forth can be communicated between the transmission control module and the engine control module.

As shown in FIG. 2, the vehicle subsystems 110 may also include an emergency stop functionality 127. The emergency stop 127 may be any suitable switch configured to provide, for example, stop, pause, or run commands to the vehicle control system 100 to either stop, temporarily interrupt, or initiate the operation of the vehicle 102. In one embodiment, the emergency stop functionality 127 may cause a full brake command to be provided to the braking system 116. The full brake command results in the service brakes being applied in full to stop the vehicle 102 as quickly as possible.

The vehicle subsystems 110 may also include an odometer 128. The odometer 128 may be used to provide information regarding the movement of the vehicle 102 (e.g., distance traveled) to the vehicle control system 100 in order to enhance the ability of the vehicle control system 100 to determine the position or movement of the vehicle 102. The odometer may also be used by the vehicle control system 100 to perform dead reckoning navigation.

The path planning module 200 is configured to determine the desired trajectory of the vehicle 102 and provide that trajectory to the vehicle management system 106. The trajectory includes a desired path along the ground as well as the desired speeds and boundary area. The desired trajectory may be determined using path and speed constraints defined before the vehicle 102 begins operating autonomously (e.g., pre-mission planning stage). As mentioned above in connection with the navigation module 204, the route that the vehicle 102 follows may be defined beforehand and loaded into the vehicle control system 100. For example, the route may be defined in terms of a series of waypoints that define a path along the ground, a path boundary, and/or speed constraints for each section of the path. The path planning module 200 provides reactive path corrections to this nominal path to account for current conditions, such as vehicle dynamic limits, obstacles (positive obstacles such as large rocks, trees, etc. and negative obstacles such as road edges, drop-offs, and cliffs), terrain grade, and so forth.

In one embodiment, the path planning module 200 may be configured to use a tree algorithm that branches from the base at the current waypoint. The tree build function may be constrained by the pre-defined path boundary and/or speed so that the resulting tree is not too large to process. Branches of the tree are computed using a model of the vehicle 102 (e.g., steering system and vehicle dynamics) to ensure that the candidate paths are drivable. One potentially suitable model is described in U.S. Prov. Pat. App. No. 60/723,363, entitled "Vehicle Control System and Method," filed on Oct. 4, 2005, which is hereby incorporated herein by reference in its entirety. The tree algorithm may be derived from the Rapidly-exploring Random Tree (RRT) path planner where the growth of the tree is limited to a fixed number of branches (levels).

The tree represents a series of candidate paths for the vehicle 102 to travel along. The vehicle control system 100 selects a path from the various candidate paths based on a scoring algorithm that considers distance from the route centerline, path curvature, obstacle avoidance, boundary area constraints, and so forth. The path planning module 200 may generate at least 100 candidate paths, at least 1000 candidate paths, or at least about 2000 candidate paths each planning cycle. Typically, the path planning module 200 performs a path analysis each time a waypoint is reached. The path planning module 200 may also be configured to adjust the maximum speed of the vehicle 102 to account for path geometry and current conditions. The initial desired speed may be set to the maximum determined during the pre-mission planning stage. The speed management component of the path planning module 200 may be configured to adjust the initial set speed depending on conditions. In one embodiment, the speed management component of the path planning module 200 may be configured to reduce the maximum speed of each section of the path depending on the current conditions.

In another embodiment, the path planning module 200 may be configured to continually calculate and adjust the path while the vehicle 102 is traveling (e.g., real-time path planning). In yet another embodiment, the path planning module 200 may be configured to reevaluate the path if the vehicle 102 encounters a situation that prevents the vehicle 102 from continuing on the original path (e.g., a washed out road, fallen tree, rock slide, etc.). In this situation, the path planning module 200 may be configured to determine the best way for the vehicle 102 to proceed to the waypoint. The path planning module 200 may include or have access to some of the same information that may be included in the navigation module 204 such as topographical maps, road maps, aerial or satellite images, and so forth, to allow the path planning module 200 to determine the best path for the vehicle 102.

Figure 13:
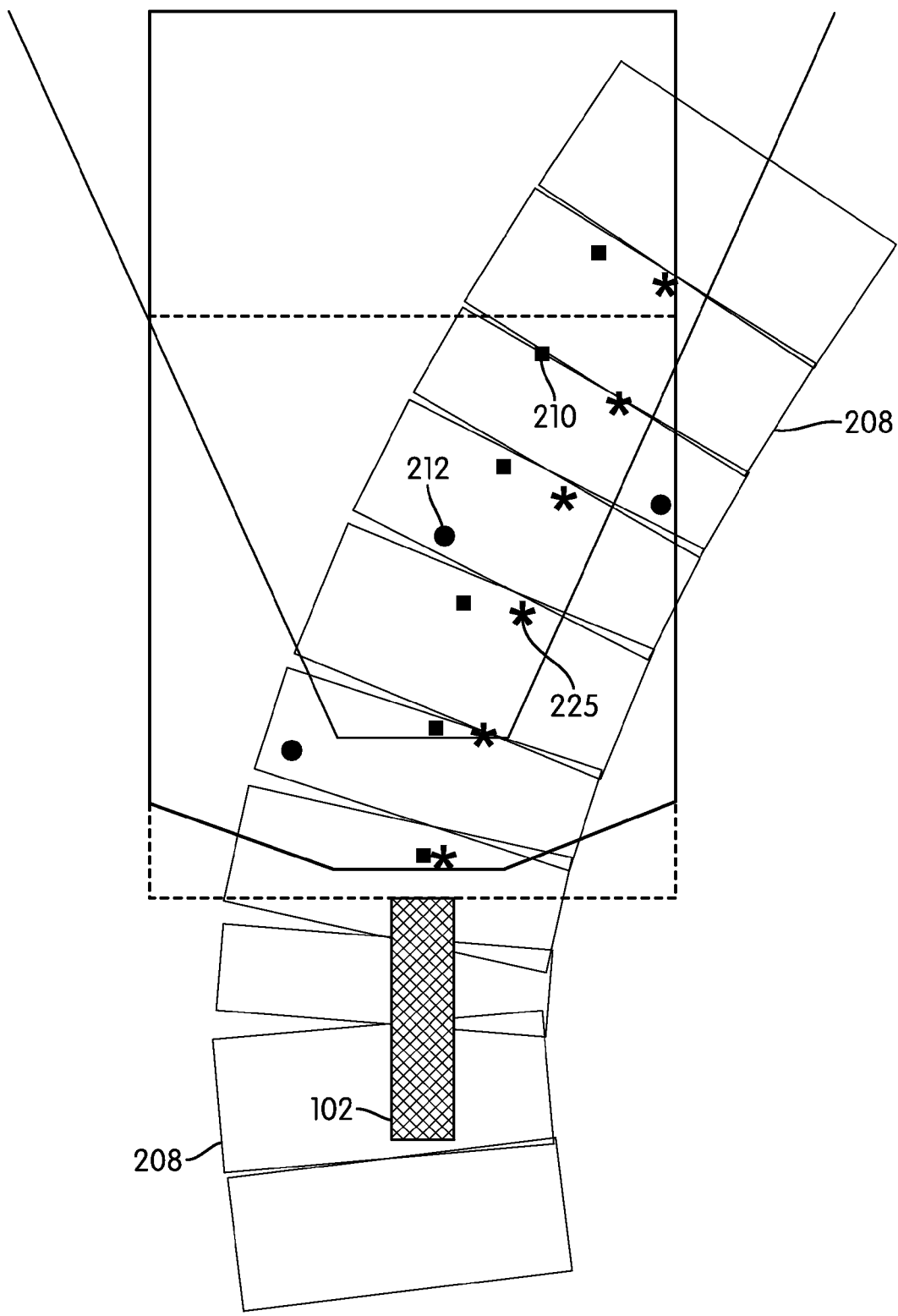
FIGS. 13-15 are illustrations of the path planning, obstacle detection, and obstacle avoidance capabilities of another embodiment of an autonomous and/or semi-autonomous vehicle.

FIG. 13 shows a graphical representation of a path generated by the path planning module 200. In FIG. 13, the vehicle 102 is represented by the long rectangular box. The sequence of boxes 208 represents the path that is loaded into the vehicle management system 106 before the vehicle 102 begins operating autonomously. The numbers identified by the reference numeral 210 represent the real-time path generated by the path planning module 200. FIG. 13 also shows obstacles 212 detected by the terrain detection system 104. As shown in FIG. 13, the path 210 of the vehicle 102 is adjusted to the right of the center of the pre-loaded path to avoid obstacles in the turn. The data boxes (e.g., control data, command response, state data, path data) in FIG. 13 show data associated with the path, vehicle state, and control state of the vehicle 102.

Figure 15:
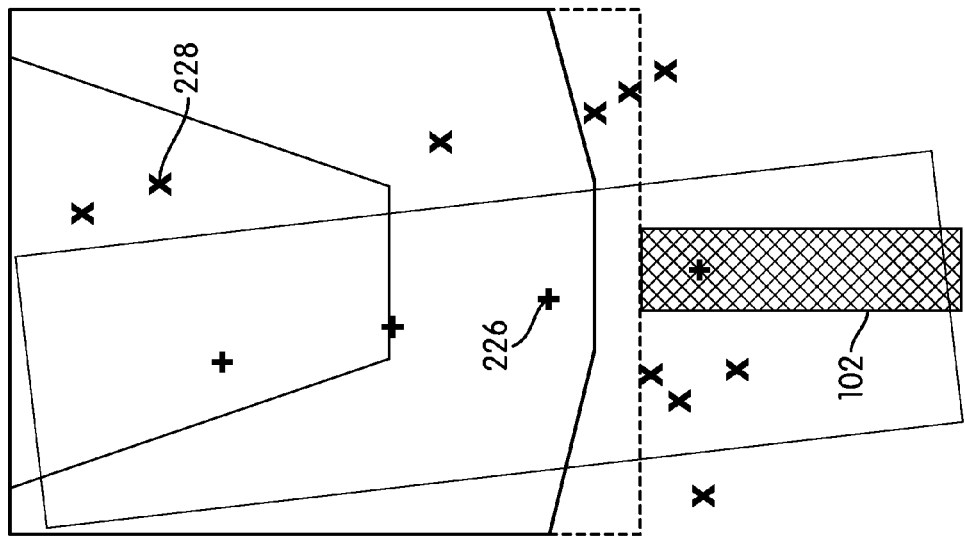
Figure 14:
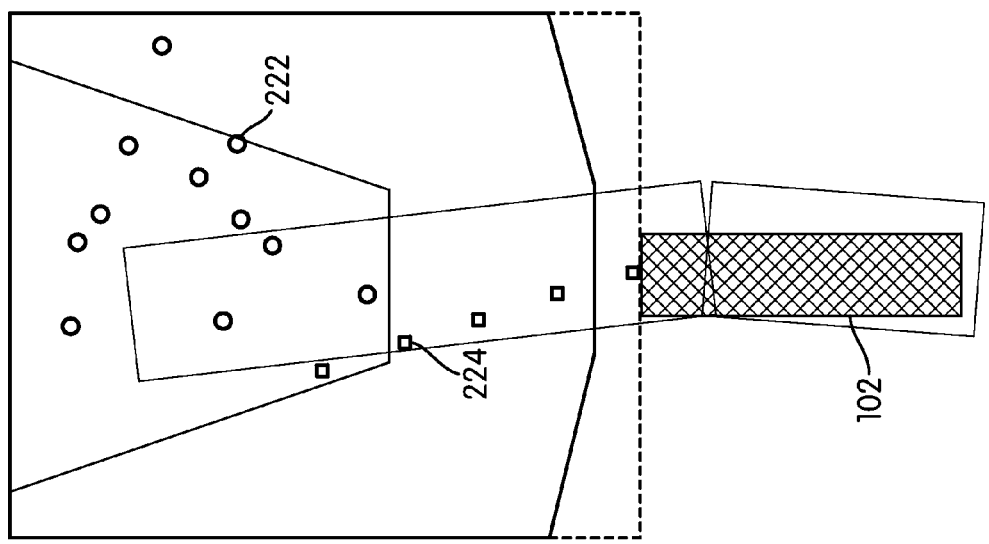
Figure 16:
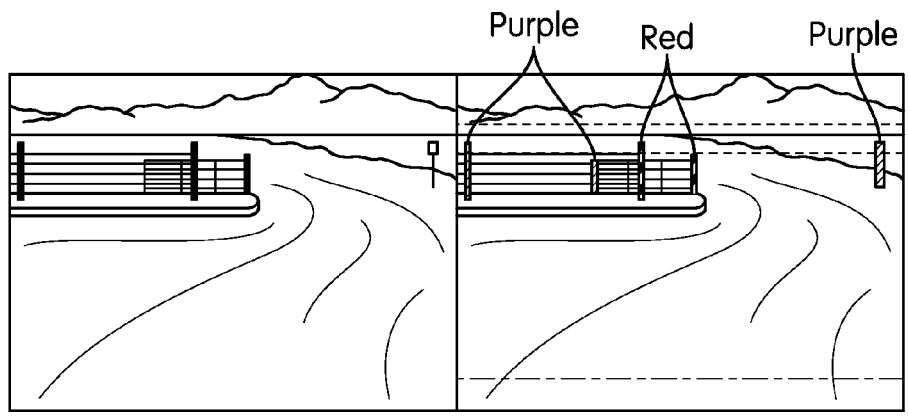
FIGS. 16-19 are pictures showing the obstacle detection capability of the vision system.
Figure 17:
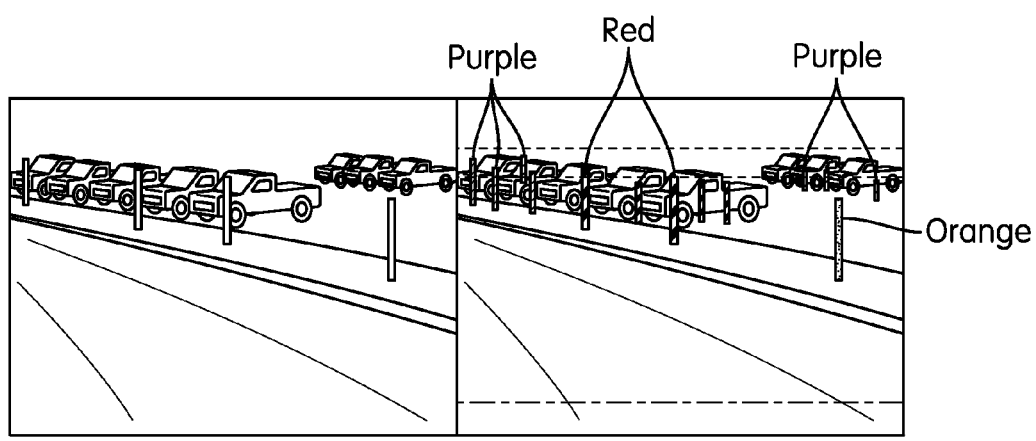
Figure 18:
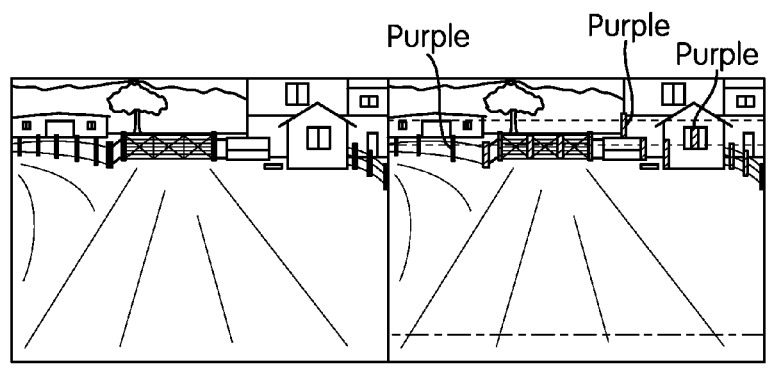
Figure 19:
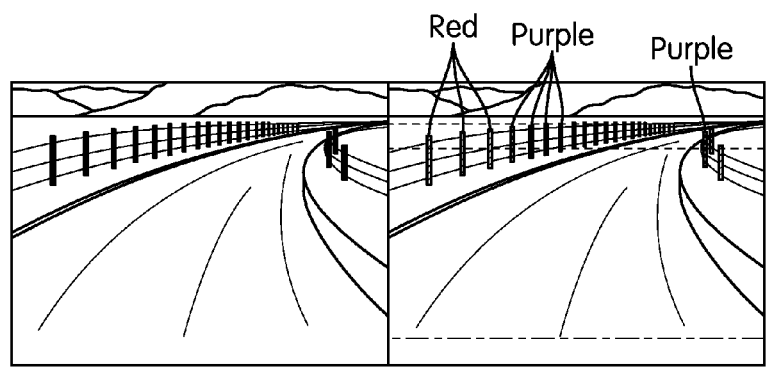
Figure 20:
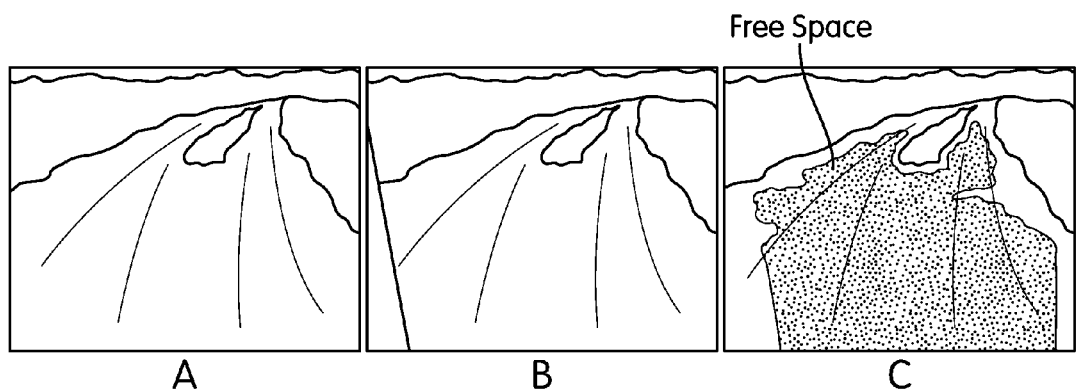
FIGS. 20A-20C are a series of pictures that show the path detection capability of the vision system.

FIG. 14 is an illustration of the path 224 (the path 224 is the sequence of numbers shown in FIG. 14) generated by the path planning module 200 which shows obstacles 222 detected using the first LIDAR system 103. Similarly, FIG. 15 is an illustration of the path 226 (the path 226 is the sequence of numbers shown in FIG. 15) generated by the path planning module 200 which shows obstacles 228 detected using the second LIDAR system 105.

The vehicle management system 106 controls the movement of the vehicle 102 along the path by providing wheel angle commands to the steering system 112. The wheel angle commands move the vehicle 102 along the path defined by the path planning module 200. This may be accomplished by computing deviations from the desired path and converting the deviations into steer angle commands that are sent to the steering servo.

The vehicle management system 106 may include a capture steering mode and a track steering mode. The capture steering mode refers to the steering mode that is used based on the pre-loaded path data. The track steering mode refers to the steering mode that is used during normal operation. Capture and track steering modes may be automatically selected based on current conditions.

The capture steering mode uses course error as the control parameter. The vehicle management system 106 creates a steer angle command that aligns the ground track of the vehicle with the direct bearing to the next waypoint. This type of control may be referred to as homing control. Capture steering mode is typically only used when the vehicle 102 first begins autonomous operation.

The track steering mode uses linear cross track deviation and cross track deviation rate to align the vehicle's path along the ground with the waypoint course. Track angle error and steer angle command limiters may be used to limit the commanded steer angle to values that are achievable by the vehicle 102. The command limiters incorporate vehicle dynamic limits with margins built in to ensure that the vehicle does not get into an unsafe condition. This may also mean that the vehicle 102 operates at levels below its maximum dynamic capability when in autonomous mode. The vehicle management system 106 may also anticipate turns so that the transition between traveling between waypoints may be accomplished without overshoots.

The vehicle management system 106 is configured to monitor and dynamically change to conditions using information from the path planning module 200, the navigation module 204, the vehicle control module 202, and the information database 206. The vehicle management system 106 may be configured to handle a number of situations that may arise during autonomous operation. When the situation occurs, the vehicle management system 106 is configured to proceed through certain operations to address the situation.

Examples of situations that may arise include:

(1) transition to and from e-stop state—when the e-stop is activated, the vehicle management system 106 is configured to stop the vehicle 102. When the e-stop is deactivated, the vehicle management system 106 is configured to initiate normal operation.

(2) no valid path ahead—the vehicle 102 is commanded to stop and wait for the vehicle management system 106 to obtain a valid path. If no valid path is found, the vehicle management system 106 will back the vehicle 102 up and try again.

(3) obstacle detected behind vehicle while backing up—the vehicle management system 106 stops the vehicle 102 and initiates normal operation of the vehicle 102 to find a valid path ahead.

(4) a large course change requiring a back up maneuver—the vehicle management system 106 operates the vehicle 102 around a three-point turn.

(5) narrow tunnel—the vehicle management system 106 guides the vehicle 102 through the tunnel primarily using the LIDAR systems 103, 105.

(6) stuck between obstacles—the vehicle management system 106 implements the stuck behavior when the vehicle 102 cannot make progress along the route because it is continually going back and forth so that it is stuck between obstacles. The vehicle management system 106 positions the vehicle 102 at different angles to search for a valid path. If no valid path is found, then the vehicle management system 106 ignores low confidence obstacles in an attempt to eliminate low confidence obstacles. The last resort is to go forward along the pre-loaded route ignoring all obstacles.

The vehicle control system 100 may also be configured to detect a collision involving the vehicle 102. Upon detection of a collision, the vehicle control system 100 may be configured to run a diagnostic check on each input and output device that is part of the vehicle control system 100 to determine if all of them are online and functional.

The functionality of the vehicle management system 106 may be similar to the Distributed Architecture for Mobile Navigation (DAMN) where the vehicle ordinarily follows the path generated by the path planning module 200 but the path can be overwritten depending on the current conditions. However, in some embodiments, the DAMN architecture may be modified to use a rules-based decision logic (instead of a complex voting scheme) to determine when the path should be overwritten. The use of rules-based decision logic may be more deterministic and robust than other solutions, which may render itself more useful in fleet applications.

The system manager 108 is the module of the vehicle control system 100 that allows a user to interface with the vehicle control system 100 to execute control commands and review the status of various systems and devices. The system manager 108 is also configured to continuously monitor the status of the various applications included in the vehicle control system 100. If the system manager 108 determines that an application is no longer functioning normally, the system manager 108 is configured to stop and restart the application to return normal functionality. The vehicle control system 100 may be configured so that if the system manager 108 fails, the vehicle control system 100 can continue operating.

In the context of a convoy of vehicles 102, the first vehicle 102 in the convoy may be configured to operate autonomously. The remainder of the vehicles may operate autonomously as well, but instead of actively sensing and avoiding obstacles, each of the remaining vehicles may be configured to follow the one in front of it. This way there are not a large number of vehicles 102 in the convoy operating to independently find the best path to a destination. The vehicles 102 may be configured so that if the lead vehicle 102 is disabled, the vehicle 102 behind the lead vehicle 102 may take over leading the convoy.

Figure 10:
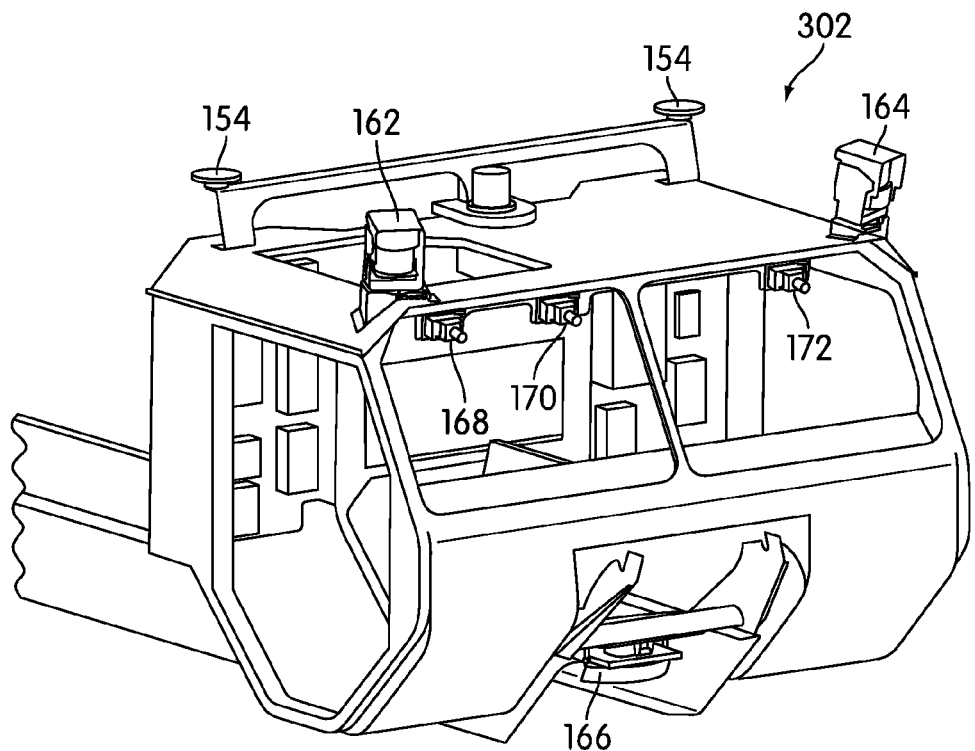
FIG. 10 is a perspective view of another embodiment of an autonomous and/or semi-autonomous vehicle.
Figure 11:
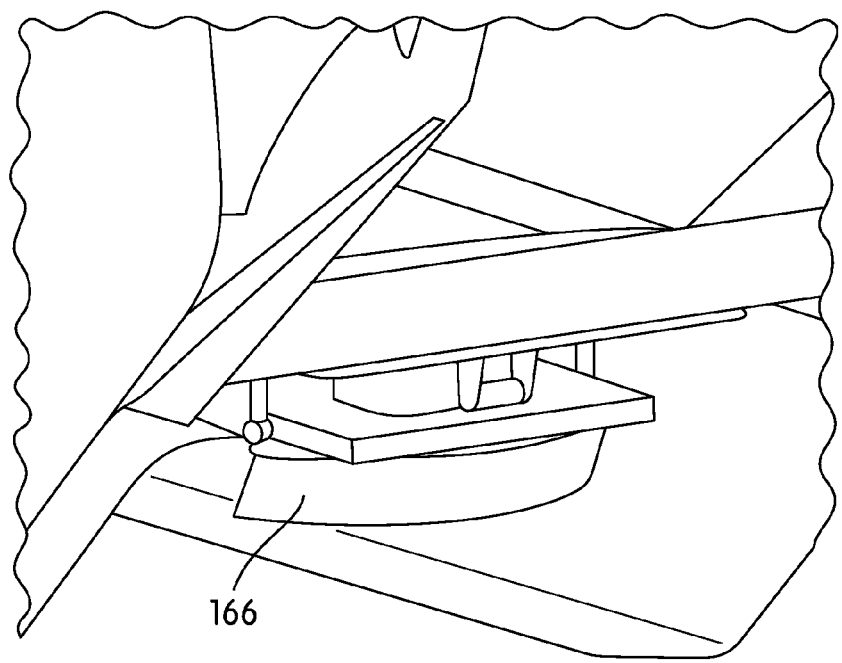
FIG. 11 is a perspective view of the vehicle in FIG. 10 showing sensors positioned near the lower front section of the vehicle.

FIGS. 10-12 show another vehicle 302 which includes the vehicle control system 100. The vehicle 302 may be a heavy duty tactical military vehicle. The vehicle 302 may be configured to function as a cargo truck (e.g., multiple configurations of a cargo truck that can carry different types and amounts of cargo), a fuel servicing truck, a load handling system truck (e.g., includes a lift arm that loads pallets onto the vehicle), a bridge transport vehicle, and a recovery vehicle (e.g., wrecker vehicle) with cranes and winches. The vehicle 302 may be configured so that it is capable of being transported by a C130 airplane.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., consensus definitions from widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification are understood as modified in all instances by the term "about." At the very least, and not as an attempt to limit the application of the doctrine of equivalents to the claims, each numerical parameter recited in the specification or claims which is modified by the term "about" should at least be construed in light of the number of recited significant digits and by applying ordinary rounding techniques. Moreover, all ranges disclosed herein are to be understood to encompass any and all subranges subsumed therein. For example, a stated range of 1 to 10 should be considered to include any and all subranges between and inclusive of the minimum value of 1 and the maximum value of 10; that is, all subranges beginning with a minimum value of 1 or more and ending with a maximum value of 10 or less (e.g., 5.5 to 10).

What is claimed is:

1. A vision system comprising:
a processor; and
a plurality of cameras each of which is configured to be communicatively coupled to the processor, the plurality of cameras including at least three cameras;
wherein the processor is configured to select input from different combinations of the plurality of cameras based on a parameter that is associated with at least one of a status of a vehicle and a surrounding environment of the vehicle, such that the processor is configured to select a first combination of two or more of the plurality of cameras when the parameter is within a first value range and a second combination of two or more of the plurality of cameras when the parameter is within a second value range,
wherein the first combination of cameras includes two cameras spaced apart by a first distance and the second combination of cameras includes two cameras spaced apart by a second distance, the first distance being larger than the second distance,
wherein the vision system is used to identify one or more objects at varying distances from the plurality of cameras, and
wherein the processor receives input from the first combination of cameras when the one or more objects are at a third distance and the processor receives input from the second combination of cameras when the one or more objects are at a fourth distance, the third distance being larger than the fourth distance.

2. The vision system of claim 1, wherein the parameter includes a speed of the vehicle.

3. The vision system of claim 1, wherein the parameter includes a steering angle of the vehicle.

4. The vision system of claim 1, wherein the cameras are each a different type of camera.

5. The vision system of claim 1, wherein at least one of the cameras includes an infrared camera.

6. The vision system of claim 1, wherein the vision system is configured for use with an autonomous vehicle.

7. The vision system of claim 1, wherein at least one of the plurality of cameras is a video camera.

* * * * *